US007980920B2

(12) United States Patent
Akiyama et al.

(10) Patent No.: US 7,980,920 B2
(45) Date of Patent: Jul. 19, 2011

(54) SPECTACLE LENS MANUFACTURING METHOD

(75) Inventors: Hisanori Akiyama, Tokyo (JP); Masashi Nishioka, Tokyo (JP); Michio Arai, Tokyo (JP)

(73) Assignee: Hoya Corporation, Tokyo (JP)

( * ) Notice: Subject to any disclaimer, the term of this patent is extended or adjusted under 35 U.S.C. 154(b) by 71 days.

(21) Appl. No.: 11/629,528

(22) PCT Filed: Jun. 29, 2005

(86) PCT No.: PCT/JP2005/011954
§ 371 (c)(1),
(2), (4) Date: Dec. 14, 2006

(87) PCT Pub. No.: WO2006/003939
PCT Pub. Date: Jan. 12, 2006

(65) Prior Publication Data
US 2008/0051012 A1    Feb. 28, 2008

(30) Foreign Application Priority Data
Jun. 30, 2004    (JP) .................... 2004-194350

(51) Int. Cl.
B24B 49/00    (2006.01)
B24B 1/00    (2006.01)

(52) U.S. Cl. .............. 451/5; 451/9; 451/10; 451/11; 451/42; 451/43; 451/54

(58) Field of Classification Search ............. 451/5, 42, 451/43, 54, 57, 58, 9, 10, 11, 44
See application file for complete search history.

(56) References Cited

U.S. PATENT DOCUMENTS
6,595,639 B1 *    7/2003    Ho et al. ................ 351/177
6,702,653 B2 *    3/2004    Shibata ................... 451/42
6,722,944 B2 *    4/2004    Akiyama et al. ........ 451/5
6,743,486 B1 *    6/2004    Miyazawa ............... 427/596
(Continued)

FOREIGN PATENT DOCUMENTS
JP    U 2-142814    12/1990
(Continued)

OTHER PUBLICATIONS
Oct. 28, 2009 European Search Report issued in PCT/JP2005011954.

Primary Examiner — Eileen P. Morgan
(74) Attorney, Agent, or Firm — Oliff & Berridge, PLC

(57) ABSTRACT

A manufacturing method of a spectacle lens improving a manufacturing yield and a production efficiency is provided. The manufacturing method of the spectacle lens in which necessary information for a frame machining of a spectacle lens (progressive-power lens 20) including spectacle rim related information is obtained, and both surfaces of a convex surface and a concave surface are edge/polish machined from a spectacle lens blanks. When the convex surface or the concave surface is polish machined, and thereafter, the next surface is machined, the spectacle rim related information and layout information of the edge machining are obtained, and first provisional reference position marks 1 to 3 and second provisional reference position marks 4 to 6 guiding a geometrical horizontal reference and a geometrical perpendicular reference of the lens are inscribed at positions outside of an edge shape 111 as identification marks for the machined surface being polished as a provisional reference marking process, an optical layout is performed for the surface to be machined next based on these provisional reference position marks to perform a lens block to a lens machining tool.

7 Claims, 18 Drawing Sheets

U.S. PATENT DOCUMENTS

| | | | |
|---|---|---|---|
| 6,790,124 B2 * | 9/2004 | Shibata | 451/5 |
| 6,813,536 B1 * | 11/2004 | Gottschald | 700/160 |
| 6,814,650 B2 * | 11/2004 | Bernard et al. | 451/5 |
| 6,871,158 B2 * | 3/2005 | Suzuki et al. | 702/155 |
| 6,872,120 B2 * | 3/2005 | Miyazawa et al. | 451/5 |
| 2002/0089642 A1 | 7/2002 | Shirayanagi | |
| 2003/0017783 A1 * | 1/2003 | Bernard et al. | 451/5 |
| 2005/0151927 A1 * | 7/2005 | Andrews et al. | 351/177 |
| 2007/0262061 A1 * | 11/2007 | Agmon et al. | 219/121.6 |
| 2007/0291268 A1 * | 12/2007 | Samukawa | 356/399 |
| 2010/0105293 A1 * | 4/2010 | Hamanaka et al. | 451/43 |

FOREIGN PATENT DOCUMENTS

| | | |
|---|---|---|
| JP | A 6-191159 | 7/1994 |
| JP | A 2000-258732 | 9/2000 |
| JP | A 2000-288891 | 10/2000 |
| JP | A 2002-22598 | 1/2002 |
| JP | A 2003-344813 | 12/2003 |
| WO | WO 99/06225 | 2/1999 |

* cited by examiner

SPECTACLE LENS MANUFACTURING METHOD

TECHNICAL FIELD

The present invention relates to a manufacturing method of an inscribed spectacle lens.

BACKGROUND ART

In recent years, an edge machined lens supply system in which an edge machined lens is supplied from a lens manufacturer side to a spectacle shop has been expanding. In this system, the lens manufacturer receives framing information including frame information which is selected by a customer by online from the spectacle shop, machining conditions are set based on this framing information, the edging machining is performed, and the edge machined lens is supplied to the spectacle shop.

In Patent Document 1, an improvement of a marking performed within these machining processes is proposed so as to improve a manufacturing yield as an object thereof.

Besides, as a variety of markings for a conventional spectacle lens which is added to a commercially available lens, there are a marking normally called as a hidden mark (in which lens manufacturing maker, lens optical information, layout information, and so on are added), a paint mark, and so on, added to a semi-finished lens such as a progressive-power lens (a surface of one side is machined and the surface of the other side is not machined. Hereinafter, called as semi-lens) performed at a lens manufacturing factory and so on.

In the Patent Document 1, a laser marking is performed on a machined surface of a circular semi-lens which is before thin-machined or edge-machined so that a lens machiner or a lens inspector can see a frame rim shape thereof by a visible mark based on shape information of a frame received from the spectacle shop in advance. Namely, a worker is able to distinguish a region where a failure can be occurred and where a failure can not be occurred by this marking.

Meanwhile, a normal marking process in a process before the edge-machining is described. For example, when an unmachined surface of a semi-lens of a progressive-power lens is machined, this semi-lens is layout blocked to a machining tool or a machining equipment, and therefore, layout information to determine a machining reference is required. Consequently, some machining reference position is determined and the marking is performed on the lens surface with the paint mark, after a diopter test and a check of an optical layout of a machined surface of the semi-lens to be used are performed. This semi-lens is blocked to the machining tool or the machining equipment based on this marking information, and the machining of the unmachined surface is performed.

[Patent Document 1] Japanese Patent Application Laid-open No. 2000-288891

DISCLOSURE OF THE INVENTION

Problems to be Solved by the Invention

However, in a method to make a marking of an edge shape of a frame rim on a spectacle lens disclosed in the Patent Document 1, many detailed shape data are required to express the shape accurately and it is difficult to keep an accuracy of the marking because a lens surface is a curved surface. In particular, when there is some error in a drawing direction of the edge shape at a time of an inscription, it is difficult to visually recognize the deviation. For example, in case of an cylindrical prescription lens and a progressive-power lens, when some error is occurred in a rotational direction relative to directions of a cylindrical axis and a progressive zone length, an unnecessary marking is remained on a spectacle lens after the edge machining.

Besides, there are various shapes in a spectacle frame and many of the shapes are complicated, and it is difficult to recognize the edge shape of the frame non-ambiguously and easily when an inspector performs a visual inspection.

Besides, in recent years, a bi-aspherical type progressive-power lens is proposed and these type of lenses basically have both surfaces as prescription surfaces, and both sides machining are to be performed in accordance with a prescription after an order is received. In that case, when one surface is machined, and thereafter, a lens is removed from a lens holder, and the other surface is attached to a machining tool, it is required to block to the machining tool after optical information is detected again, as a result, in a paint mark method of a semi-lens machining, it takes a lot of time for the diopter test and the check of the optical layout. Further, these diopter test and the check of the optical layout require an advanced measuring technique and a level of skill because a lens itself is transparent and has a curvature, and when a detection accuracy is low, it becomes a cause of many failures such as a machining axis deviation.

Besides, when a laser marking equipment is used for a plastic lens, there is a problem that it is not easy to adjust a definition, a control of a positioning of an inscription, an accuracy of the inscription, and so on, because a lens surface is a curbed surface.

The present invention is made to solve the above-stated problems, and the object thereof is to provide a manufacturing method of a spectacle lens capable of improving a manufacturing yield and a production efficiency.

Means for Solving the Problems

According to an aspect of the invention, a manufacturing method of a spectacle lens in which necessary information for a frame machining of the spectacle lens including spectacle rim related information is obtained, and both surfaces of a convex surface and a concave surface are edge and polish machined from a spectacle lens blanks, the manufacturing method of the spectacle lens, including: obtaining the spectacle rim related information and layout information of an edge machining, and inscribing provisional reference marks as identification marks, guiding a geometrical horizontal reference and a geometrical perpendicular reference of the lens for a machined surface which is polish machined, at positions outside of a spectacle rim shape as a provisional reference marking process, when the convex surface or the concave surface is polish machined, and thereafter, a next surface is machined; and performing an optical layout for the surface to be machined next based on the provisional reference marks to thereby perform a lens block to a lens machining tool.

According to an aspect of the invention, the provisional reference marks are inscribed in a vicinity of outside of the spectacle rim shape and in a vicinity of a lens circumferential edge.

According to an aspect of the invention, a holding of the spectacle lens is sustained by using the same lens holding member from the blocking process of the spectacle lens blanks to the completion of the provisional reference marking process.

According to an aspect of the invention, a same place is inscribe machined redundantly at least twice or more by a laser in the provisional reference marking process.

According to an aspect of the invention, wherein an intermittent control is performed in which an oscillation of the laser is controlled intermittently and repeated with a time difference in the provisional reference marking process.

According to an aspect of the invention, inscription positions to the spectacle lens are calculated by using at least a three-dimensional lens surface design data.

According to an aspect of the invention, a manufacturing method of a spectacle lens in which necessary information for a frame machining of the spectacle lens including spectacle rim related information is obtained, and both surfaces of a convex surface and a concave surface are edge and polish machined from a spectacle lens blanks, the manufacturing method of the spectacle lens, including: obtaining the spectacle rim related information and layout information of an edge machining, and inscribing hidden marks guiding a geometrical horizontal reference and a geometrical perpendicular reference of the lens for a machined surface which is polish machined at positions inside of the spectacle rim shape as a marking process, when the convex surface or the concave surface is polish machined, and thereafter, the next surface is machined; and performing an optical layout for the surface to be machined next based on these hidden marks, and performing a lens block to a lens machining tool.

According to an aspect of the invention, a manufacturing method of a spectacle lens, in which a manufacturing side obtains spectacle lens related information, spectacle rim related information including an edge shape, and necessary information for frame machining including a prescription value, and layout related information from an ordering side, the related information and the manufacturing related information are inscribed on the spectacle lens by a laser to perform a lens machining, the manufacturing method of the spectacle lens, including: calculating a region to be lost by an edge machining from at least the spectacle rim related information; and inscribing a quadrangle to which the edge shape of the spectacle rim being the region lost by the edge machining on the spectacle lens to thereby manufacture the corresponding spectacle lens.

Advantageous Effect of the Invention

According to an aspect of the invention, provisional reference marks guiding a geometrical horizontal reference and a geometrical perpendicular reference of a lens as identification marks, are inscribed at positions outside of a spectacle rim shape for a machined surface which is polish machined. Consequently, it is not necessary to perform a diopter measurement or an optical layout check when a convex surface or a concave surface is polish machined and thereafter the next surface is machined, and a layout block can be performed easily and accurately with reference to the provisional reference marks being the identification marks. Further, the identification marks can easily be identified by vision, and therefore, a workability is improved. Herewith, a production efficiency of a spectacle lens can be improved and a manufacturing yield can be improved owing to the layout block with high accuracy.

According to an aspect of the invention, the provisional reference marks are inscribed in a vicinity of outside of an edge shape and in a vicinity of a lens circumferential edge, and therefore, for example, even when a circumferential edge of an uncut lens is defected by a thin machining or the like, and one or plurality of the provisional reference marks in the vicinity of the circumferential edge of the lens are disappeared, the provisional reference positions can be specified easily by using the provisional reference marks in the vicinity of outside of the edge shape.

According to an aspect of the invention, an attach/detach of a machining too and the lens are not performed from a blocking process of a spectacle lens blanks until a completion of a provisional reference marking process, and machining references at the beginning of the blocking process are used without modification, and therefore, an error in a positioning can be suppressed, and the marking of the provisional reference marks with high accuracy becomes possible.

In a marking method according to an aspect of the invention, it is possible to improve an inscription accuracy can be improved because the inscription machining is performed to the same place for at least twice or more redundantly in the inscription to the spectacle lens, and therefore, a definition can be adjusted.

In a marking method according to an aspect of the invention, an oscillation of a laser is controlled intermittently, and at lease once or more period in which the inscription machining is not performed is set and controlled during the process from a first inscription machining to a last inscription machining. Owing to a setting of this interval, a heat caused by a laser inscription can be radiated during the period in which the inscription machining is not performed, and a deformation of the lens surface caused by the heating can be suppressed.

In a marking method according to an aspect of the invention, the inscription positions to the spectacle lens are calculated by using at least a three-dimensional lens surface design data, and therefore, it is possible to inscribe appropriately even if shapes of the spectacle lens are different.

According to an aspect of the invention, after a machining of a convex surface or a concave surface of a spectacle lens of which both surfaces are to be grind and polish machined, spectacle rim related information and layout information of an edge machining are obtained, and hidden marks guiding a geometrical horizontal reference and a geometrical perpendicular reference of a lens are inscribed at positions inside of the spectacle rim shape for the machined surface performed the polish machining. Consequently, it is not necessary to perform a diopter measurement and an optical layout check, and an optical layout can be performed for the surface to be machined next based on the hidden marks to perform a layout block, and therefore, a production efficiency of the spectacle lens can be improved and the manufacturing yield can be improved.

According to an aspect of the invention, a region to be lost by an edge machining is inscribed on a spectacle lens as a quadrangle to which an edge shape of a spectacle rim is inscribed, and therefore, the edge shape can be recognized non-ambiguously and easily even when the edge shape is different, to easily identify the region to be cut by the edge machining. Consequently, a load of a visual inspection inspecting a quality of the spectacle lens can be eliminated. Further, even if there is an error in a rotational direction in an inscription position of the corresponding quadrangle by accident, it is possible to recognize an occurrence of error easily in the rotational direction from a line shape being a part of the inscription of the quadrangle. Further, the edge shape is a simple quadrangle, a disposition can be defined by a minimum of four points of coordinate position, and therefore, a detailed edge shape data is not required. An inspection efficiency of the spectacle lens rises from these reasons, and therefore, the production efficiency can be improved.

BEST MODE FOR CARRYING OUT THE INVENTION

Hereinafter, a best mode to implement the present invention will be described based on the drawings.

FIG. 1A and FIG. 1B are views showing a progressive-power lens in which various related information is inscribed in an embodiment of a spectacle lens according to the present invention. FIG. 2 is a view schematically showing a manufacturing system of the spectacle lens implementing an embodiment of a manufacturing method of the spectacle lens according to the present invention, and in particular, it is explaining with a focus on a laser inscription system.

In FIG. 1, spectacle lens related information, spectacle rim related information, a prescription value and layout related information, and manufacturing related information are inscribed to this progressive-power lens 20 (hereinafter, called as a lens 20).

As the spectacle lens related information, for example, product information 11 for specifying a supply maker and a product name of the lens 20, refractive index information 17, and so on, can be cited.

As the spectacle rim related information, for example, a boxing area mark 8 and so on being a quadrangle to which an edge shape of the spectacle frame is inscribed can be cited.

As the prescription value and the layout related information, for example, alignment reference marks 9 and 10 to be reference positions when the lens 20 is framed into the spectacle frame, progressive zone length information 16, addition refractive-power information 18, addition definition information 19 defining a measuring method of this addition refractive-power, and so on, can be cited.

As the manufacturing related information, for example, first provisional reference position marks 1 to 3 to be the reference positions for a blocking, second provisional reference position marks 4 to 6 used for a thin machining and so on, serial number information 12 showing a serial number being a specific number of an acceptance of an order or a manufacture and a division of left and right, and individual manufacturing indicating information 13 displaying a special manufacturing indication information applied only for the progressive-power lens 20, can be cited.

Besides, in FIG. 1, a reference numeral 14 shows a horizontal reference line of the lens 20, a reference numeral 15 shows a meridian in a perpendicular direction passing through a design center of the corresponding lens 20, and a reference numeral 7 represents an edge shape of a frame rim to which the corresponding lens 20 is framed. However, these horizontal reference line 14, the meridian 15 passing through the design center, the edge shape 7 of the frame rim are shown in the drawing for convenience of explanation, and they are not inscribed on the lens 20 actually.

Besides, the lens 20 shown in FIG. 1 is a lens for a right eye in which a left side is an ear side, and a right side is a nose side in the same drawing, and the edge shape 7 of the frame rim and the boxing area mark 8 are inner shifted to the nose side along the horizontal reference line 14. This inner shift amount is included in the layout information of the edge machining. Consequently, the above-stated first provisional reference position marks 1 to 3 and the second provisional reference position marks 4 to 6 are inscribed on the lens 20 based on the spectacle rim information (edge shape) of the spectacle frame and the layout information of the above-stated edge machining. Incidentally, a lens for a left eye has a layout in which respective components of the lens for the right eye are disposed in symmetry relative to the perpendicular line (meridian) 15 passing through the design center, and therefore, it is not shown in the drawing.

The above-stated two alignment reference marks 9, 10 are appended on the horizontal reference line 14 of the lens 20 in symmetry with the perpendicular line (meridian) 15 passing through the design center. Namely, the two alignment reference marks 9, 10 are inscribed on the horizontal reference line 14 and at positions same distances away from the perpendicular line (meridian) 15 passing through the design center of the lens 20. These alignment reference marks 9, 10 are inscribed at the positions which are remained on a surface of this lens 20 after the lens 20 is framed in the spectacle frame. Concretely speaking, the distance from the perpendicular line (meridian) 15 passing through the design center of the lens 20 to the alignment reference marks 9, 10 are set to be, for example, 17 mm.

In vicinities of these alignment reference marks 9, 10, the above-stated product information 11, the progressive zone length information 16 representing the length of the progressive zone, the refractive index information 17 being a material refractive index of the lens 20, the addition refractive-power information 18 being the addition refractive-power for near vision of the corresponding lens 20, and the addition definition information 19 are inscribed. In detail, the product information 11, the progressive zone length information 16, and the refractive index information 17 are inscribed at a lower portion proximity to the alignment reference mark 10 of the ear side, and addition diopter specifying information 18 and definition method specifying information 19 are inscribed at a lower portion proximity to the alignment reference mark 9 of the nose side. All of the above-stated inscriptions 9, 10, 11, 16, 17, 18, and 19 are hidden marks. These hidden marks are inscribed in a method difficult to be recognized easily by vision, and they are inscribed within a region surrounded by the edge shape 7 considering the edge shape 7 of the frame rim. Consequently, these hidden marks are on an optical surface of the lens 20 after the edge machining, and they are able to be recognized.

Besides, identification marks which can be easily recognized by vision are inscribed on the lens 20 of the present embodiment in addition to the above-stated hidden marks. This identification mark has six functions.

A first function is to be an index display of a block reference position for machining of a concave surface performed after a polish of a convex surface, and a second function is to be an index of an inscription reference position for inscribing the hidden mark. A third function is to be an index display of a layout mark print reference position displaying an alignment reference position, a refractive-power measuring position for near vision, and a refractive-power position for distance vision, an inset amount, and so on, and a fourth function is to be an index display of a layout block reference position in the edge machining. A fifth function is to be a display of a region cut off by the edge machining, and a sixth function is to be a display of the manufacturing related information.

The above-stated first provisional reference position marks 1 and 3 to be the reference positions of the blocking for the concave surface machining are on the horizontal reference line 14, disposed at 1 mm to 1.5 mm inside of an outmost peripheral portion of this lens 20, and they are inscribed with the identification mark in a cross. Besides, the first provisional reference position mark 2 is disposed at 1 mm to 1.5 mm inside of an outer peripheral portion of the lens on the perpendicular line (meridian) 15 passing through the design center of the lens 20, and inscribed with the identification mark in the cross. The boxing area mark 8 identifying a region lost by the edge machining is inscribed with the identification mark at an approximately 1 mm to 2 mm outside of the quadrangle to which the edge shape of the frame rim in the spectacle frame is inscribed.

Besides, for example, in a reprocessing and so on such as a thin machining or a repolishing, the above-stated second provisional reference position marks 4 to 6 as the manufacturing related information are inscribed with the identification marks, which are to be the reference positions when the above-stated first provisional reference position marks 1 to 3 are disappeared. These second provisional reference position marks 4 and 6 are on the horizontal reference line 14, disposed at positions 1 mm to 2 mm outside of the boxing area mark 8, and inscribed in circular having a diameter of 1.5 mm to 3 mm. Besides, the second provisional reference position mark 5 is disposed at the position 1 mm to 2 mm outside of the boxing area mark 8 on the perpendicular line (meridian) 15 passing through the design center, and inscribed with "×" in a line of 1.5 mm to 3 mm.

These provisional reference position marks 1 to 6 are to guide a geometrical horizontal reference (horizontal reference line 14) and a geometrical perpendicular reference (meridian 15) of the lens 20, and they are also used as an inscription reference position to inscribe a hidden mark, a layout mark print reference position, and a layout block reference position in the edge machining.

Besides, the above-stated serial number information 12 as the manufacturing related information being the specific number of a division between left and right, an acceptance of an order or a manufacture, is inscribed at a lower portion of the boxing area 8 with the identification mark. Besides, the above-stated individual manufacturing indicating information 13 as the manufacturing related information displaying the special manufacturing indication contents applied only for the progressive-power lens 20 is disposed at a lower portion of the serial number information 12, and inscribed with the identification mark.

This lens 20 is so-called a circular lens before the edge machining, but all of the information 1, 2, 3, 4, 5, 6, 8, 12, and 13 being the identification marks exist at the region outside of the edge rim shape in the spectacle frame. Consequently, these identification marks are not remained on the lens surface of the lens 20 after the edge machining, and therefore, they are disposed so as not to be an interference of a visual field of a spectacle lens wearer.

Next, a configuration of a manufacturing system of the spectacle lens in the present embodiment is described by using a block diagram in FIG. 2.

In FIG. 2, at first, an ordering terminal 30 of a spectacle shop 35 and a main frame 39 are connected via a communication line 31 in this spectacle lens manufacturing system. The ordering terminal 30 is allocated at the spectacle shop 35 as an orderer. The main frame 39 is allocated at a factory 38 as a manufacturing maker side of spectacles. At this factory 38 side, a factory server 40 is connected to the main frame 39 via a LAN circuit 32, and a computer terminal 44 of a laser inscription equipment 41 is connected to this factory server 40. Incidentally, all of the circuits are connected information interchangeable.

The ordering terminal 30 of the spectacle shop 35 supports and displays an input of various data required when a spectacle lens is ordered. A prescription value data 36 of a subject eye and so on is able to be inputted to an input portion of this ordering terminal 30. Besides, a frame measuring equipment and so on measuring a frame shape of a spectacle frame is connected to the input portion of the ordering terminal 30, and a frame shape data 37 is inputted to the ordering terminal 30. The prescription value data 36, the frame shape data 37, and so on, inputted to the ordering terminal 30 are transmitted to the main frame 39 of the factory 38 via the communication line 31. The transmitted frame shape data 37, the prescription value data 36, and so on, are stored in the main frame 39 as an order entry data. Incidentally, the frame shape data 36 is preferable to be three-dimensional shape information including frame material information, and it may be an indirect shape data other than the shape data directly read from a frame tracer. Namely, a data mode may be direct or indirect if the information can finally be recognized as the frame shape information to reproduce the shape by the manufacturing side.

Besides, an ordering mode from the spectacle shop here may be a custom-made lens supply system (without framing process), an edge machined lens supply system (stock lens and custom-made machined lens may be used), a thin machined lens supply system (optimal thick lens supply system: without framing process), and a frame machined spectacle supply system (supply a finished product as a spectacle), and any mode can be used for the present invention. Incidentally, in the following embodiment, the system is the edge machined lens supply system, and a mode in which the edge machining is performed by using a custom-made lens machining system founding a lens surface by an acceptance of an order is described. Further, the spectacle lens is a progressive-power lens designed in a bi-aspherical type which requires a grind and polish machining of both surfaces. In the manufacturing processes, descriptions of surface treatment processes such as a dyeing, a hard coating, an antireflection film coating, a water repellent treatment coating, and other additional functions and so on, are not given.

The main frame 39 obtains the prescription value data 36 and so on from the ordering terminal 30 and performs a design of the spectacle lens so as to accommodate with the corresponding prescription value. In this main frame 39, a spectacle lens design program, a machining data generation program, and so on, are stored.

The design program has a function to create a design data of each spectacle lens based on the obtained prescription value data 36. The machining data generation program realizes a function to generate a machining data required when a lens machining equipment performs an actual lens machining based on the design data created by the design program. In this machining data, a surface design data of the spectacle lens, the frame shape data 37, the prescription value data 36, and so on, are included.

The main frame 39 executes the above-stated spectacle lens design program and the machining data generation program to thereby generates the machining data as control information of the lens machining equipment, and transmits the generated machining data to the factory server 40. The factory server 40 stores the above-stated machining data together with an order number of the ordered data. Each machining data to be stored is assigned a serial number used only in a manufacturing factory by each ordered data for identification, and they are related to each machining data.

The laser inscription equipment 41 obtains the machining data from the factory server 40 via the LAN circuit 32, and the above-stated various related information (namely, the spectacle lens related information, the spectacle rim related information, the prescription value and layout related information, and the manufacturing related information) are inscribed to the spectacle lens based on this machining data.

The laser inscription equipment 41 respectively inscribes the above-stated first provisional reference position marks 1 to 3, the second provisional reference position marks 4 to 6, the boxing area mark 8, the alignment reference marks 9 and 10, the product information 11, the serial number information 12, the individual manufacturing indicating information 13, the progressive zone length information 16, the refractive index information 17, the addition refractive-power information 18, and the addition definition information 19, among the above-stated related information, is described. This laser inscription equipment 41 includes a computer terminal 44, a laser oscillating portion 45, and a mounting table position control portion 46, as shown in FIG. 2.

In the present embodiment, every request of information in the manufacturing process executed by the computer terminal 44 to the factory server 40 is performed via the serial number information. When the serial number information of a manufacturing instruction appended to a not-machined lens or a bar code including the serial number information is inputted by an input device such as a scanner, the computer terminal 44 of the laser inscription equipment 41 requests the machining data to create the inscription position related information (namely, the spectacle lens related information, the spectacle rim related information, the prescription value and the layout related information, and the manufacturing related information) corresponding to the serial number information to the factory server 40. The factory server 40 transmits the machining data according to the request. The surface design data, the frame shape data, and the prescription value data of the spectacle lens are included in the transmitted machining data. Besides, this machining data is the one in which a type of inscription and a three-dimensional coordinate value (x, y, z) are combined as described later.

The machining data transmitted from the factory server 40 is transmitted to a communication control portion 42 of the computer terminal 44 in the laser inscription equipment 41 via the LAN circuit 32. In this computer terminal 44, a calculation processing portion 43 calculates a detail of data for inscription from the received machining data. Contents of calculated results are an output value of a laser, an inscription speed value, and the number of times value of a superimposed inscription as for inscriptions 1, 2, 3, 4, 5, 6, 8, 9, 10, 11, 12, 13, 16, 17, 18, and 19, and they are specified by each inscription.

The laser oscillating portion 45 is to oscillate a laser for inscription as shown in FIG. 2 and FIG. 8, and as a specification of a laser oscillator 50 being a component thereof, a $CO_2$ laser is used in which a focal length is 145.00 mm; an oscillation laser is a $CO_2$ laser class 4; a laser oscillation output is maximum 30 [W], average 12 [W] of an oscillation output; and a light emission peak wavelength is 10.6 [µm] in the present embodiment. A control of a laser beam is performed with a printing method of a galvano scanning method, a printing range of 90 mm×90 mm, a character size of 0.2 mm to 90 mm, and a scanning speed of 3000 mm/s.

A diverging laser or a collimated laser 51 radiated from this laser oscillator 50 is radial expanded a spot thereof by a beam expander 52, changed a direction by a pair of reflector plates 53, 54, condensed so as to converge to a predetermined inscription position on the surface of the lens 20 by a condenser lens (for example, fθ lens) 55, and converged and irradiated to the above-stated inscription position of the above-stated lens 20 via a laser oscillation opening 56. Consequently, the above-stated inscription is carried out by braking with melting, altering, or the like, or deforming with an expansion, of the surface or a vicinity of the surface of a lens base material by an irradiated energy of the laser 51. Namely, a refractive index, a transmittance, and so on, of the melted, altered, or the like portion differ from the other portion, and therefore, it can be identified from external to function as a mark.

In the laser oscillating portion 45, one of the pair of reflective plates 53, 54 is for an X direction, and the other is for a Y direction. By controlling postures of these reflective plates 53, 54, a spot position of the laser can be scanned arbitrary on the surface of the lens 20. The spot of the laser is traced along a character, a drawing, or the like, on the surface of the lens 20, to thereby symbols as the above-stated respective information 1, 2, 3, 4, 5, 6, 8, 9, 10, 11, 12, 13, 16, 17, 18, and 19 are inscribed on the corresponding lens 20.

The mounting table position control portion 46 holds the lens 20 to be an object of the inscription on a mounting table 57, and moves this mounting table 57. By this move of the mounting table 57, a distance from the laser oscillating opening 56 of the laser oscillating portion 45 in a fixed state and the inscription position of the lens 20 is set at the distance to converge the laser irradiated from the laser oscillating opening 56 (for example, 145 mm), and thereby, the laser from the laser oscillating opening 56 is condensed to the inscription position of the lens 20 on the mounting table 57 to inscribe a desired symbol and so on.

There is a case when the mounting table position control portion 46 moves the mounting table 57 in an X direction and a Y direction orthogonal with each other which are in a horizontal direction, and in a Z direction which is in a vertical direction, and a case when moves in the X direction which is the horizontal direction and in the Z direction which is in the vertical direction but does not move in the Y direction as shown by a reference numeral 99 in FIG. 8. In the present embodiment shown in FIG. 3 to FIG. 9, the latter example is shown. In the present embodiment, the inscription position in the Y direction of the lens 20 is realized by a minute move in the Y direction of the reflector plate 54 as same as the minute move in the X direction of the reflector plate 53 in the laser oscillating portion 45.

As shown in FIG. 4 to FIG. 6, a configuration of the mounting table position control portion 46 is an X direction rail 60 is laid extendedly in the horizontal direction (X direction) via a base plate 59 on a base table 58, and an X direction moving table 81 is slidably arranged to this X direction rail 60 via a slider 80. A driving screw shaft 82 is screwed to a nut portion 85 of this X direction moving table 81. This driving screw shaft 82 is rotationally driven by a stepping motor 83 disposed on the base plate 59 via a coupling 84.

A vertical supporting member 86 is vertically arranged on the above-stated X direction moving table 81, a Z direction rail 87 is laid extendedly in the vertical direction to this vertical supporting member 86, and a Z direction moving table 93 is slidably disposed to this Z direction rail 87 via a slider 88. The mounting table 57 is attached to this Z direction moving table 93, and a driving screw shaft 90 is screwed to a nut portion 89 of the corresponding Z direction moving table 93. This driving screw shaft 90 is rotationally driven by a stepping motor 91 placed on the vertical supporting member 86 via a coupling 92.

Consequently, the mounting table 57 is moved in the horizontal direction (X direction) by the drive of the stepping motor 83 via the driving screw shaft 82 and the X direction moving table 81, and the mounting table 57 is moved in the vertical direction (Z direction) by the drive of the stepping motor 91 via the driving screw shaft 90 and the Z direction moving table 93. Incidentally, a reference numeral 94 in FIG. 4 and FIG. 5 is a bearing. Besides, a reference numeral 95 is a spring member 95 to lift and support the mounting table 57 and the Z direction moving table 93 to the vertical supporting member 86.

In a configuration of the mounting table 57, as shown in FIG. 7, a vertical reference surface portion 96, a horizontal reference surface portion 97, and a rotational reference shaft portion 98 composed of two engaging projections are formed with a shape and a size corresponding to a fixture 70 as a later-described lens holding member, to hold and position the lens 20. Besides, the fixture 70 shown in FIG. 9 is bonded to the lens 20 mounted on the mounting table 57 with a bonding agent 74 by using a later-described concave surface blocking equipment 100 (refer to FIG. 10). Incidentally, as the bonding agent 74, a wax or a low-melting alloy is preferable. This fixture 70 includes a perpendicular reference surface portion 72A in cylindrical surface shape, a horizontal reference surface portion 72B in planer shape, and a rotational reference surface portion 73 extending in a diametrical direction at a bottom surface.

In a state in which the lens 20 is mounted on the mounting table 57 via the fixture 70, the perpendicular reference surface 72A and the horizontal reference surface 72B of the fixture 70 respectively abut to the perpendicular reference surface 96 and the horizontal reference surface 97 of the mounting table 57, and the rotational reference surface 73 of the fixture 70 (refer to FIG. 13) is engaged and positioned to the rotational reference shaft 98 of the mounting table 57. Namely, in the inscription machining to the lens 20, the machining reference position is the perpendicular reference surface 72A, the horizontal reference surface 72B, and the rotational reference surface 73 of the fixture 70. Here, the above-stated rotational reference surface 73 of the fixture 70 is composed as facing grooves formed in the horizontal direction in a tapered state as shown in FIG. 9 and FIG. 13, and engaged to the rotational reference shaft 98 of the mounting table 57. Consequently, if the lens 20 is already optically layouted and blocked to the fixture 70, it is mounted while keeping the layout state, in a state the lens 20 is mounted on the mounting table 57.

A correction relating to an inscription accuracy of the laser inscription equipment 41 is performed by adjusting to accord the inscription position to the actual lens 20 with a center position of the laser irradiated from the laser oscillating portion 45 when the corresponding laser inscription equipment 41 is assembled, but as for a fine adjustment unable to be adjusted mechanically, a coordinate value of the inscription machining reference position is corrected by a software.

Machining Method of the Present Embodiment

FIG. 12 is a view showing a summary of a machining method of a spectacle lens in the present embodiment in a flow chart, and the summary is to describe a grind and polish machining of a concave and convex both surfaces in a progressive-power lens. Incidentally, an objective of a manufacturing method of the spectacle lens in the present embodiment is a bi-surface progressive-power lens, in particular, a bi-aspherical type progressive-power lens disclosed in Japanese Patent Application Laid-open No. 2003-344813 by the present applicant, but it is not limited to this lens design and can be preferably applied to a lens, semi-lens of which concave and convex both surfaces can be ground and polished.

In case the concave and convex both surfaces of the spectacle lens (lens 20) is machined, when one surface (first surface) is polished, and thereafter, the other surface (second surface) is machined, an index able to be identified non-ambiguously does not exist on the polished surface. Consequently, in the present embodiment, it is characterized that identification marks for a blocking reference and a machining reference are founded on an optical surface of the spectacle lens after polished for the machining of the second surface. Based on these identification marks, the blocking and the machining of the second surface is performed.

Further, in the present embodiment, a series of machining of respective marking, grinding, and polishing are performed in a state the lens is blocked by a fixture. Namely, especially in the marking process, it is generally required to perform an optical measurement by removing the lens 20 from a fixture 71 to obtain optical information of the lens by a lens measurement, but in the present embodiment, a mechanism is adopted, in which a positioning can be performed by using the laser inscription equipment 41 and the fixture 70 as stated above, and therefore, these processes can be performed in the same holding state of the fixture 70. Incidentally, in the present embodiment, terms of a grind machining and a cut machining are used without distinguishing particularly, used actually as equivalent terms, and it is also expressed as a surface found machining.

(Step S1: Blanks Block for Machining of Convex Surface)

At first, a concave surface side blocking for machining a convex surface is performed for the lens 20 as shown in FIG. 12 (S1). Namely, a non-machined surface of a lens blanks 71 (FIG. 9) being a lens base material is fixed to the fixture 70 as a lens holding member by using the bonding agent 74. Here, it is called as a blocking or a block to fix the lens blanks 71 to the fixture 70 via the bonding agent 74.

FIG. 10 is a perspective view of a concave surface blocking equipment 100 to block the concave surface side of the lens blanks 71. To perform the concave surface side block, at first, a centering mechanism 102 is provided around a push-up member 101 on which the lens blanks 71 is placed, and a geometrical center of the lens blanks 71 is accorded with a center of the push-up member 101. In this centering mechanism 102, a rotary base ring 103 and a fixing base ring 104 are disposed sequentially around the push-up member 101, three clamps 106 are pivotally supported to this fixing base ring 104 by using fixing pins 105, and movable pins 108 fixed to the rotary base ring 103 are inserted into long holes 107 of the respective clamps 106.

The rotary base ring 103 is pivoted by a drive of a not-shown air cylinder, and thereby, the movable pins 108 of this rotary base ring 103 press the clamps 106 via the long holes 107 of the clamps 106, the three clamps 106 are pivoted inside centering on the fixing pins 105. Herewith, clamp pins 109 vertically arranged on the respective clamps 106 press a vertical surface of the lens blanks 71 to make a centering of the corresponding lens blanks 71. Next, in a state the lens blanks 71 is pushed up by rising the push-up member 101, a predetermined amount of wax as the bonding agent is dropped on the concave surface of the lens blanks 71. The fixture 70 is thereafter lowered so that the wax is pressed to be spread. The wax is solid, and then, the lens blanks 71 is blocked to the fixture 70.

FIG. 9 is a view showing the lens blanks 71 and the fixture 70 after the blocking. As the machining reference position, the reference surfaces 72A, 72B, and 73 of this same fixture 70 are used until the cutting process, the polishing process, and the inscribing (marking) process of the convex surface are completed.

(Step S2: Edge Machining of Convex Surface)

Next, a cut machining of a convex surface is performed (S2).

A curb generator is used for the found (grind) machining of the convex surface. A cut machining equipment of NC control is used as the curb generator of the present embodiment. FIG. 9 shows a holding state of the lens 20 before it is attached to this equipment. Incidentally, a machining accuracy of the curb generator is approximately 1 micron.

(Step S3: Polishing of Convex Surface)

Next, the polishing of the convex surface is performed (S3).

After the convex surface of the lens blanks 71 is cut into a predetermined shape by the above-stated curb generator, the lens blanks 71 held by the same fixture 70 is attached to a polishing equipment to polish the cut surface.

(Step S4: Marking)

After the above-stated polishing of the convex surface is completed, provisional reference marks are inscribed to the lens 20 (S4) by using the laser inscription equipment 41. A machining data for an inscribing machining is stored at a factory server 40 (FIG. 2) beforehand, and a computer terminal 44 of the laser inscription equipment 41 takes this machining data. Data required for framing including, for example, an optical design data, a frame shape data, and a prescription value data of the spectacle lens, data required for machining, and so on, are included in the machining data. The above-stated data is represented in a three-dimensional space coordinate value because the actual lens 20 has not a plane surface but a curved surface.

Meanwhile, FIG. 1A and FIG. 1B show a basic two-dimensional disposition of each inscription as for the lens 20. Namely, the computer terminal 44 of the laser inscription equipment 41 calculates the three-dimensional space coordinate (x', y', z') on the lens for every inscription mark from the above-stated three-dimensional curved surface data (x, y, z) of the spectacle lens surface design data and the two-dimensional inscription disposed position (x', y') in FIG. 1A and FIG. 1B, and it is determined as the inscription position. Incidentally, as a definition in a coordinate system, a space coordinate of the lens is represented by an orthogonal coordinate system of XYZ, a horizontal reference line 14 of the lens is an X axis, a meridian 15 passing through a design center of the lens is a Y axis, and a thickness direction of the lens is a Z axis.

Next, a laser oscillating portion 45 irradiates a laser for the calculated inscription position. Machining reference positions of the coordinate on the lens surface in this inscribing machining is as follows: horizontal directions (X, Y) and a perpendicular direction (Z) are the reference surfaces 72B (horizontal direction) and 72A (perpendicular direction) of the fixture 70 shown in FIG. 9; a rotational reference surface of a reference numeral 73 in this drawing is a groove in a tapered state formed in the horizontal direction, and this becomes a reference surface in a rotational direction centering on a geometrical center of the lens 20. Consequently, the laser inscription equipment 41 is able to perform an accurate laser irradiation at the inscription position represented by the three-dimensional position coordinate calculated as stated above on the lens 20, based on the reference surfaces 72A, 72B, and 73.

Among the inscription marks inscribed on the convex surface of the lens 20 by the irradiation of the laser, a boxing area mark 8 is to identify a region lost by an edge machining as shown in FIG. 1A, and it is a quadrangle to which an edge shape of a frame rim (spectacle rim) in a spectacle frame is inscribing. Besides, as shown in FIG. 1B, in a display region 21 of symbols or figures to identify the region lost by the edge machining, every region 23 outside of the quadrangle 22 to which the edge shape of the frame rim in the spectacle frame is inscribing is made to be a opaque frosted glass state to divide into a transparent region and a opaque region. Besides, they may be distinguished by a coloring, a pattern, or the like.

Here, in the present embodiment, laser machining conditions of the present embodiment when the above-stated information 1, 2, 3, 4, 5, 6, 8, 9, 10, 11, 12, 13, 16, 17, 18, and 19 are inscribed are described. Incidentally, the lens 20 used in the present embodiment is an epitio based polyurethane lens with a refractive index of approximately 1.7.

Inscription machining conditions of first provisional reference position marks 1 to 3 are set as follows: an inscribing output is 35% of a maximum value of 30 W; an inscribing speed is 450 mm/s; the number of times of same place superimposed inscription is twice.

Besides, the inscription machining conditions of second provisional reference position marks 4 to 6, boxing area mark 8, serial number information 12, and individual manufacturing indicating information 13 are set as follows: the inscribing output is 35% of the maximum value of 30 W; the inscribing speed is 450 mm/s; the number of times of same place superimposed inscription is once.

Besides, the inscription machining conditions of alignment reference marks 9, 10, product information 11, addition refractive-power information 18, and progressive zone length information 16 being hidden marks are as follows: the inscribing output is 7.0% of the maximum value of 30 W; the inscribing speed is 350 mm/s; the number of times of the same place superimposed inscription is six times. In case of this hidden marks, when the number of times of repetition of the superimposed inscription is set to be six times, it is preferable to perform a repetition inscription of remaining three times with intervals after the superimposed inscription is performed three times one after another. Namely, an intermittent control function repeating with time difference is combined to a laser machining control, a thermal radiation is accelerated by the setting of this interval, and a deformation of the surface of the lens 20 caused by a heating is controlled.

This interval are different depends on a type of a mark and a lens material, but in the present embodiment, it is set as approximately from 0.8 seconds to 2 seconds. Incidentally, in the present embodiment, a shape of the inscription is a character height of 2.0 [mm], a character width of 2.0 [mm], and a line width of 0.12 [mm]. Incidentally, an inscription position machining accuracy of the inscription equipment is approximately 1 micron.

(Step S5: Removal of Holding Member)

After the above-stated inscription machining to convex surface, a concave surface side holding member removal operation removing the fixture 70 as shown in FIG. 12 is performed (S5). The bonding agent 74 at the concave surface side of a semi-lens inscribed on the convex surface is peeled off to separate the semi-lens and the fixture 70.

(Step S6: Blocking for Concave Surface Machining)

Next, a blocking of the convex surface side for the concave surface machining is performed (S6).

FIG. 11 is a view showing a state of a lens blanks 61 as the above-stated semi-lens and a blocking equipment 65 when the lens convex surface side (polished surface side) is blocked. The convex surface blocking equipment 65 includes a not-shown CCD camera and display device. The display device includes a function to display a lens image in mounted state photographed by the CCD camera, and a function to draw a lens diameter, and horizontal and perpendicular reference lines based on lens information and layout information obtained in advance. When a worker mounts the lens blanks 61 on the blocking equipment 65, the lens outside diameter and the horizontal and perpendicular reference lines are displayed in overlapped state based on the image of the lens blanks 61 in mounted state photographed by the CCD camera and the above-stated lens information. Besides, the provisional reference position marks 1 to 6 as shown in FIG. 1A and FIG. 1B are inscribed on the surface of the lens blanks 61, and therefore, they are also displayed together with the mounting state of the lens.

Consequently, the worker is able to determine a block position of the lens blanks 61 by positioning the three points of the reference positions at a lens circumferential edge (first provisional reference position marks 1 to 3 in FIG. 1A and FIG. 1B), or other reference points of provisional references (second provisional reference position marks 4 to 6 in FIG. 1A and FIG. 1B) to accord with the horizontal and perpendicular reference lines of the image. Incidentally, a circular outside diameter display image is set to improve a workability, and there is an effect that the lens can be moved in a vicinity of a center position of the positioning quickly as an initial operation. Besides, an image guiding at least the horizon and the perpendicular can be used as this drawing image for positioning.

When the positioning is completed, a bonding agent 62 is poured between a fixture 63 and the lens blanks 61 to bond both together. As the bonding agent 62, for example, a low-melting alloy or a wax is used. A reference numeral 64 in FIG. 11 is a block ring so that the bonding agent 62 may not be flowed out.

(Step S7, Step S8: Founding of Concave Surface Optical Surface and Polish Machining)

After the blocking of the above-stated convex surface side, a concave surface cut machining, a concave surface polishing are sequentially performed (S7, S8) as shown in FIG. 12. The concave surface cut machining is the same as the convex surface cut machining except for a difference of a lens surface design data. Namely, the concave surface cut machining is performed by modifying the surface shape data of the cut machining to a concave surface design shape data. It is also the same as for the concave surface polishing, and therefore, the description is not given.

(Step S9: Removal of Holding Member)

Next, a removal of a concave surface side holding member is performed (S9). Namely, the lens 20 after the concave and convex surfaces polishing are completed is immersed in a hot water approximately at 70 degree, to melt the low-melting alloy and the fixture 63 is removed from the lens 20.

(Step S10: Inspection)

Finally, an optical and a surface inspections are performed (S10). An appearance inspection by vision, a diopter test by a lens meter, a projection inspection of a lens inner surface by a transmitting light of a zircon lamp, and an optical performance inspection of an astigmatism of a lens whole surface are performed for the polished lens 20, and then, it is transferred to a next process such as a surface treatment and so on. After the surface treatment is completed, the hidden marks are inscribed with reference to any of the provisional reference position marks 1 to 6. Further, in the present embodiment, it is edge machined into a frame edge shape, and the machining is completed.

It is constituted as stated above, and therefore, according to the above-stated embodiment, the following effects (1) to (10) can be seen.

(1) Provisional reference position marks 1 to 6 guiding a geometrical horizontal reference and a geometrical perpendicular reference of a lens for a machined surface of a spectacle lens which is polish machined (convex surface in the present embodiment) are inscribed at positions outside of a spectacle rim shape (edge shape) 7 as identification marks, and therefore, it is not required to perform a diopter measurement or an optical layout check when a next surface (concave surface in the present embodiment) is machined after the convex surface of the spectacle lens is polish machined, and a layout block can be performed easily and accurately with reference to the provisional reference position marks 1 to 6 being the identification marks. Further, the identification mark is able to be identified easily by vision, and therefore, a workability is improved. As a result, a manufacturing efficiency of the spectacle lens can be improved and a manufacturing yield can be improved by a layout block with a good accuracy.

(2) In the machined surface of the spectacle lens which is polish machined (convex surface in the present embodiment) of the spectacle lens, the provisional reference position marks 1 to 6 are inscribed in a vicinity of outside of the edge shape 7 (second provisional reference position marks 4 to 6) and in a vicinity of circumferential edge of the lens (first provisional reference position marks 1 to 3), and therefore, for example, when the circumferential edge of an uncut lens is defected by a thin machining and so on, and one or plural of the first provisional reference position marks 1 to 3 are lost in the vicinity of the circumferential edge of the lens, the provisional reference positions can be specified easily by using the second provisional reference position marks 4 to 6 in the vicinity of the outside of the edge shape.

(3) In a n inscription to a spectacle lens such as a lens 20, the same place is redundantly inscribe machined, and therefore, a definition can be adjusted, and a heat affect for other than the inscription place of the spectacle lens can be eliminated by using a laser with a low energy level. Herewith, an inscription accuracy can be improved.

(4) The inscription to the spectacle lens such as the lens 20 is performed non-continuously, and it is controlled to set a period when the inscribing machining is not performed for at least once or more during a process from the start to the completion of the inscription. Herewith, a heat caused by a laser inscription can be radiated during the period when the inscription machining is not performed, and therefore, the heat affect for the spectacle lens is further eliminated.

(5) A same fixture 70 is used without removed during a blocking of a lens blanks 71, a foundation of an optical surface of the spectacle lens, the polish machining, and the inscription machining, and reference surfaces 72A, 72B, and 73 of the same fixture 70 are used as machining references in respective manufacturing processes of an optical surface founding process, a polishing process, and an inscription process. Herewith, an accuracy of the inscription becomes to be the same level as a machining control accuracy in a cutting equipment and a polishing equipment. Besides, an error in positioning can be suppressed, and therefore, provisional reference marking with high accuracy becomes possible.

(6) An inscription position on the spectacle lens is accurately calculated in a three-dimensional coordinate value from the surface shape of the spectacle lens such as the lens 20 to control the inscription position of the spectacle lens, and therefore, it is possible to constantly inscribe at a convergent point of a laser beam oscillated from a fixed position in the inscription for a lens optical surface of the spectacle lens. Consequently, the inscription can be performed accurately even though the spectacle lens surface to be inscribed has a complicated shape such as a progressive or a free curved surface, and a further detailed inscription can be performed at every position of the lens optical surface. Herewith, the concave surface machining, an edge machining, and a framing with high accuracy can be performed, and it is preferable for a progressive-power lens in which a high framing accuracy is required, and it is more preferable for a progressive-power lens with both surface polishing.

(7) A region lost by the edge machining is inscribed on the spectacle lens as a boxing area mark 8 (FIG. 1A) in a quadrangle shape to which an edge shape of a spectacle rim is inscribed, or as a character or a symbol 21 (FIG. 1B) representing the region cut by the edge machining, and therefore, it is possible to recognize this edge shape non-ambiguously and simply, and the region lost by the edge machining can be discriminated easily even if the edge shape is different in accordance with a type of the spectacle frame, and therefore, a load of a visual inspection can be eliminated.

(8) As the boxing area mark 8, not a shape of the spectacle rim of the spectacle lens, but the boxing area mark 8 and so on in the quadrangle to which the edge shape of the spectacle rim is inscribed, is inscribed on the spectacle lens such as the lens 20. Herewith, it is possible to easily recognize an error in a rotational direction by a linear shape of an edge of the boxing area mark 8 even if the boxing area mark 8 and so on has the error in the rotational direction relative to a cylindrical axis or a direction of a progressive zone length.

Besides, even if the rectangular boxing area mark 8 and so on has the error in the above-stated rotational direction, this rectangular boxing area mark 8 has an allowance relative to the edge shape in the actual spectacle frame of the spectacle frame, and therefore, a tolerance for a rotation error is broad, and it is possible to suppress a situation in which the spectacle lens has a failure because a part of the rectangular boxing area mark 8 is remained in the spectacle lens after the spectacle lens is edge machined.

(9) The boxing area mark 8 is made to be a simple rectangular, so it is possible to define a disposition thereof by four coordinate positions at the lowest, and therefore, a detailed edge shape data is not necessary and a data amount to be transmitted/received can be reduced.

(10) The quadrangle-shaped boxing area mark 8 (or a symbol, or a FIG. 21 to make every region 23 outside of a rectangular 22 opaque) identifying the region lost by the edge machining is inscribed on the lens 20, and therefore, the region other than this region to be lost (the region within the quadrangle shaped boxing area mark 8) is enough to be inspected for a quality assurance, and the above-stated inspection of the corresponding region to be lost can be skipped, so an inspection efficiency rises to thereby improve the production efficiency of the lens 20. Furthermore, it is not necessary to secure a quality of the region to be lost by the edge machining, and it is not necessary to judge as a failure even if there is a defect at the corresponding region to be lost. As a result, a manufacturing yield of the lens 20 can be improved.

Hereinabove, the present invention is described based on the above-stated embodiment, but the present invention is not limited to this.

As for the inscriptions of the first and second provisional reference position marks 1 to 6, all of the hidden marks 9, 10, 11, 16, 17, 18, and 19, and the identification marks 1 to 6, 8, 12, and 13 are inscribed as shown in FIG. 1A and FIG. 1B in the present embodiment, but it is also preferable to inscribe only the identification marks. For example, FIG. 14 shows the progressive-power lens 20 in which only the manufacturing related information being the identification marks are inscribed. On this lens 20, for example, the first provisional reference position marks 1 to 3, and the second provisional reference position marks 4 to 6 to be reference positions of a blocking are inscribed as the manufacturing related information.

Among these, the second provisional reference position marks 4 and 6 are on the horizontal reference line 14, disposed on an edge rim similar shape 112 at 1 mm to 2 mm outside of an edge rim shape 111 of the spectacle frame, and inscribed in circular with a diameter of 1.5 mm to 3 mm. The second provisional reference position mark 5 is disposed on the edge rim similar shape 112 at 1 mm to 2 mm outside of the edge rim shape 111 on the perpendicular line (meridian) 15 passing through a design center, and inscribed in an "×" of a line of 1.5 mm to 3 mm. Incidentally, the edge rim shape 111, the edge rim similar shape 112, the horizontal reference line 14, and the perpendicular reference line 15 are shown in the drawing for the explanation, and they are not inscribed actually.

Besides, all of the first provisional reference position marks 1 to 3 are represented by crosses in the lens 20 in FIG. 1A and FIG. 1B, but in the lens 20 in FIG. 14, the first provisional reference position marks 1 and 3 on the horizontal reference line 14 may be represented by "−", the first provisional reference position mark 2 on the perpendicular reference line 15 is represented by "+", so that a refractive-power measuring side for distance vision of the lens 20 existing at this first provisional reference position mark 2 side represented by "+" can be specified. Incidentally, the first provisional reference position marks 1 to 3 and the second provisional reference position marks 4 to 6 may be displayed apparently with other figure, character, pattern, and so on, such as the cross, "×", a circular (same applies to a size).

Further, as shown in FIG. 15, it is also preferable to respectively inscribe four points of the first and second provisional reference position marks 1 to 6 in total in a horizontal direction and in a perpendicular direction. Namely, a first provisional reference position mark 113 and a second provisional reference position mark 114 may be inscribed on the vertical reference line 15 and respectively symmetric positions with the first provisional reference position mark 2 and the second provisional reference position mark 5 relative to the horizontal reference line 14. In addition, as shown in FIG. 16, it is also preferable that provisional reference marks 116 and 117 representing a direction of a cylindrical axis 115 are inscribed.

For example, a positive lens of a spectacle lens is generally thick at a center and thin at an outer peripheral portion. Consequently, there is a case when the lens is manufactured by performing a lens design specially so that a lens shape becomes the thinnest in accordance with an edge shape for a reduction in weight and a requirement in appearance. When the lens design is performed with such a special specification, the lens may be in a state of which outside diameter is not a circular. In such a case, when the first provisional reference position marks 1 to 3 are at positions deviated to a circumferential edge of the lens 20, a situation in which the marks are lacked may be occurred. Besides, there is a case to perform a re-machining after the machining to repair a scratch on a surface. The first provisional reference position marks 1 to 3 may also be lacked in that case. At that time, it is possible to perform a re-blocking easily by using the second provisional reference position marks 4 to 6.

With a similar reason, as shown in FIG. 15, if the first provisional reference position marks 1 to 3 and the reference mark 113, the second provisional reference position marks 1 to 6 and the reference mark 114 exist four points for each, it is possible to easily perform the re-blocking and so on of the lens 20 by using the remaining first or second provisional reference position marks even if one of the first or second provisional reference position mark is lacked.

In the present embodiment, an edge machined spectacle lens is cited as a final product mode, but it can be used in a supply system of an uncut lens.

Conventionally, it is generally performed to supply a spectacle shop 35 and so on with a spectacle lens in a state of uncut lens. In that case, it is necessary to display layout information such as a refractive-power measuring position for distance vision, a refractive-power measuring position for near vision, a prism measuring position and so on in an erasable print on the spectacle lens (hereinafter called as a layout mark or a paint mark). On the lens 20 shown in FIG. 17, the layout marks are printed such as, for example, a prism measuring point 202, a geometrical horizontal position 203, a geometrical vertical position 210, a refractive-power measuring position for distance vision 207, a refractive-power measuring position for near vision 209, and an inset amount 208.

The first and second provisional reference position marks 1 to 6 in FIG. 14 are the identification marks, and they are inscribed in a vicinity of outside of an edge rim shape 111 of the uncut lens and at a circumferential edge of the lens. Consequently, it is possible to confirm these provisional reference position marks 1 to 6 easily by vision, so a printing dot (not shown) is not necessary to be performed, and therefore, the printing of the above-stated layout marks can be performed easily from the first and second provisional reference position marks 1 to 6 (only the first provisional reference position marks 1 to 3 are displayed in FIG. 17).

Further, the uncut lens is edge machined for framing at the spectacle shop 35 and so on. The above-stated first and second provisional reference position marks 1 to 6 and a reference position marks 116 and 117 in FIG. 16 can be used as reference positions of the edge machining. For example, in case of a single vision lens, generally, an optical center is specified by a lens meter. Further, a direction of a cylindrical progressive power is specified and the optical center and the cylindrical axis direction on the lens are performed markings with the printing dots (not shown). A machining tool is fixed to an edge machining equipment by using these printing dots as the reference positions to perform the machining.

Meanwhile, in the present embodiment, the reference position marks 116 and 117 are inscribed on the lens 20, and therefore, an axis direction of the cylindrical progressive power (cylindrical axis 115) can be specified easily. Besides, the optical center can be specified from a geometrical center of the lens 20 which is obtained from the horizontal reference line 14 and the vertical reference line 15 recognized by the first and second provisional reference position marks 1 to 6. Consequently, it is possible to specify the optical center position and the cylindrical axis direction of the uncut lens easily without measuring the optical center or the cylindrical axis direction by using the lens meter and so on.

Besides, normally, an accuracy of the specification of the optical center position by the lens meter is said to be 1 micron or more (for example, approximately 400 micron), and the accuracy is not high. However, in the present embodiment, it is possible to inscribe with the accuracy of 1 micron or less by the above-stated configuration of the first and second provisional reference position marks 1 to 6 (inscription is performed by using the same machining reference of cutting and polishing). Consequently, the optical center position and the cylindrical axis direction of the uncut lens can be specified accurately.

As stated above, the optical center and the cylindrical axis direction of the lens 20 are specified based on the first and second provisional reference position marks 1 to 6, and next, an optical layout block is performed for the corresponding lens 20 for the edge machining.

The above-stated optical layout block is described.

FIG. 18 is a view showing an optical layout block equipment 120 in the edge machining. Generally, after a diopter measurement of the lens 20 is finished, a suction means 123 of the optical layout block equipment 120 sucks the lens 20, rises this lens 20 up to a predetermined height, and transfers to a blocking position at an upper portion of a lens mounting table 121. At this time, a machining center of the lens 20 (optical center) is positioned to approximately accord with a center of the lens mounting table 121. Besides, the lens 20 is stayed in floating state for a few mm above an upper surface of the lens mounting table 121.

After that, a lens holder 122 is transferred to an upper portion of the lens 20, a center of the lens holder 122 is positioned to the machining center of the lens 20, the lens holder 122 is vertically lowered from the upper portion to press a convex surface "a" of the lens 20, and thereby, the lens 20 is bonded to an elastic seal 124 of the lens holder 122. At this time, the suction of the lens 20 by the suction means 123 is released. The lens holder 122 is attached to the lens 20 via the elastic seal 124, then the lens holder 122 is transferred to the edge machining equipment to perform the edge machining of the lens 20. The description hereinabove is the optical layout block of the lens 20 for the edge machining disclosed in Patent Document (Japanese Patent Application Laid-open No. 2002-22598).

Meanwhile, in the present embodiment, as shown in FIG. 14 and FIG. 15, the first and second provisional reference position marks 1 to 6 being the identification marks are inscribed on the lens 20. Consequently, as stated above, the geometrical center position or the optical center position is specified, and the lens holder 122 is positioned to the specified machining center (optical center) to be bonded by using the first and second provisional reference position marks 1 to 6, instead of the above-stated optical center or hidden marks (later-described) as the reference position marks. The lens holder 122 is then transferred to the edge machining equipment to perform the edge machining of the lens 20.

Consequently, according to the present embodiment, it is not necessary to specify the optical center by the optical measurement, and to perform a detection of the hidden marks by an image processing in the optical layout block in the edge machining. Further, the reference positions with higher accuracy than the optical measurement from the above-stated reason are inscribed as the first and second provisional reference position marks 1 to 6, and the specification of the optical center is easy and accurate. A diopter measuring equipment is not necessary, and therefore, a configuration of equipments becomes simple. Besides, the first and second provisional reference position marks 1 to 6 being the identification marks having higher visibility than the hidden marks are used as the references, and therefore, the specification of the reference positions by the image processing becomes easy. From these reasons, the production efficiency in the edge machining of the lens 20 is improved, and it becomes possible to improve the manufacturing yield by the layout block having better accuracy.

Besides, in FIG. 17, a reference numeral 20 denotes a not-machined progressive-power lens made of plastic, a reference numeral 203 denotes a horizontal reference line (geometrical horizontal position) passing through a geometrical center (prism measuring point) 202, reference numerals 231 denote hidden marks, and they are formed on the horizontal reference line 203 at two points in equal distances (for example, 17 mm) away from the geometrical center 202. These hidden marks 231 are displayed by the same small circles or the small circles and characters. A reference numeral 207 is a diopter measuring portion for distance vision (refractive-power measuring position for distance vision), a reference numeral 209 is a diopter measuring portion for near vision (refractive-power measuring position for near vision), a reference numeral 206 is a portion to see distance (for distance portion), a reference numeral 212 is a portion to see near (for near portion), a reference numeral 211 is a position of an eye point.

The positions of the diopter measuring portion for distance vision 207, the diopter measuring portion for near vision 209, and the eye point 211 are different depend on a type or a size of the lens 20. However, they are determined to be at a predetermined reference positions away from the geometrical center 202, for example, the position of the eye point 211 is the position away from a predetermined distance (for example, 2 mm) at an upper portion of the geometrical center 202, and the center of the diopter measuring position for distance vision 207 is determined at the position away from a predetermined distance (for example, 4 mm) at an upper portion of the position of the eye point 211.

Consequently, the hidden marks 231 are inscribed after the convex surface of the lens blanks 71 is polished, the image of these hidden marks 231 is taken, the image processing is performed to calculate the position coordinate, and thereby, the positions of the geometrical center 202, the eye point 211, and the center of the diopter measuring position for distance vision 207, and so on, can be calculated. Herewith, the above-stated layout marks can be printed on the convex surface of the lens 20 accurately and easily by using these hidden marks 231 as the reference.

Besides, the hidden marks 231 guiding the geometrical horizontal reference and the geometrical perpendicular reference of the lens for the polish machined surface of the lens 20 which is polish machined (convex surface in the present embodiment), are inscribed at positions inside of the spectacle rim shape (edge shape) 7, 111, by obtaining the spectacle rim related information and the layout information of the edge machining, and thereby, it is not necessary to perform the diopter measurement or the optical layout check when the next surface (concave surface in the present embodiment) is machined after the convex surface of the spectacle lens is polish machined, and the layout block can be performed easily and accurately by using these hidden marks 231 as the reference. Herewith, the production efficiency of the spectacle lens can be improved, and the manufacturing yield can be improved by the layout block with good accuracy.

Further, as for the layout blocking of the lens 20 for the edge machining, the above-stated hidden marks 231 are used as reference position marks, and thereby, the position of geometrical center or the optical center of the lens 20 is specified, then the lens holder 122 is positioned and bonded to this specified machining center (optical center). This lens holder 122 is then transferred to the edge machining equipment to perform the edge machining of the lens 20. Consequently, also in this case, it is not necessary to specify the optical center by the optical measurement in the optical layout block within the edge machining, and therefore, the production efficiency in the edge machining of the lens 20 is improved, and the manufacturing yield can be improved by the layout block with better accuracy.

Incidentally, the $CO_2$ laser is used in the present embodiment, but an excimer laser, a YAG laser, or the like, can be used. Besides, the spectacle lens such as the lens 20 to which an inscription machining is performed may be a finished product having a desired optical surfaces in both surfaces, or a half-finished product (semi-finished lens) after the convex surface is polished. Besides, the boxing area mark 8 is not limited to a quadrangle of a rectangle, but it may be a quadrangle such as a square, a rhombus, or a parallelogram, or it may be a polygon such as a pentagon or a hexagon. Besides, the line width of the mark is set to be approximately 0.5 mm, but it is not limited particularly within a range if it can be confirmed by vision approximately from 0.25 mm to 1.5 mm.

INDUSTRIAL AVAILABILITY

In the present embodiment, a progressive-power lens is set as a main objective as a spectacle lens, but it is also applicable to a rotational symmetric aspherical progressive-power lens, other free curved surface lenses, or a spherical lens.

Figure 1A:
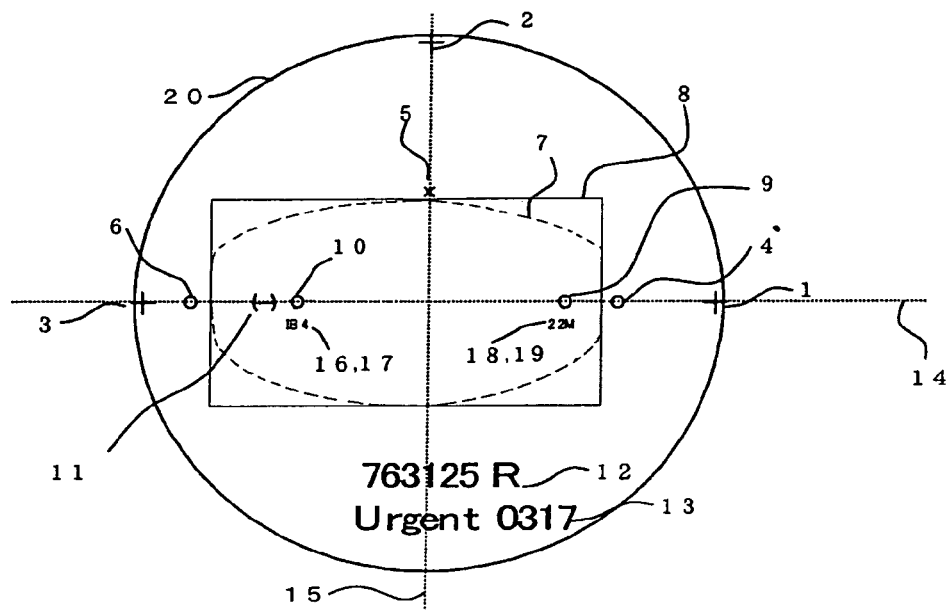
FIG. 1A and FIG. 1B are views showing a progressive-power lens in which various related information is inscribed in an embodiment of a spectacle lens according to the present invention.
Figure 1B:
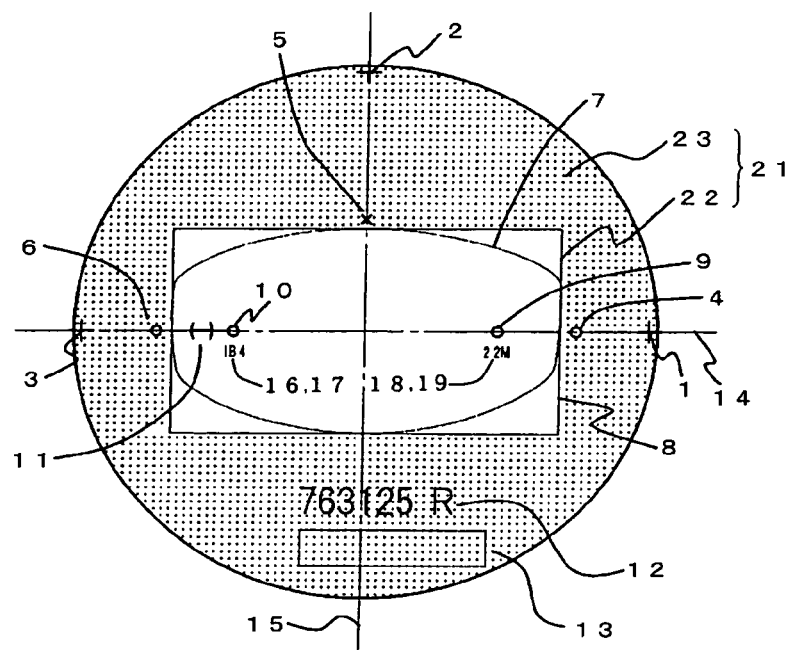
Figure 2:
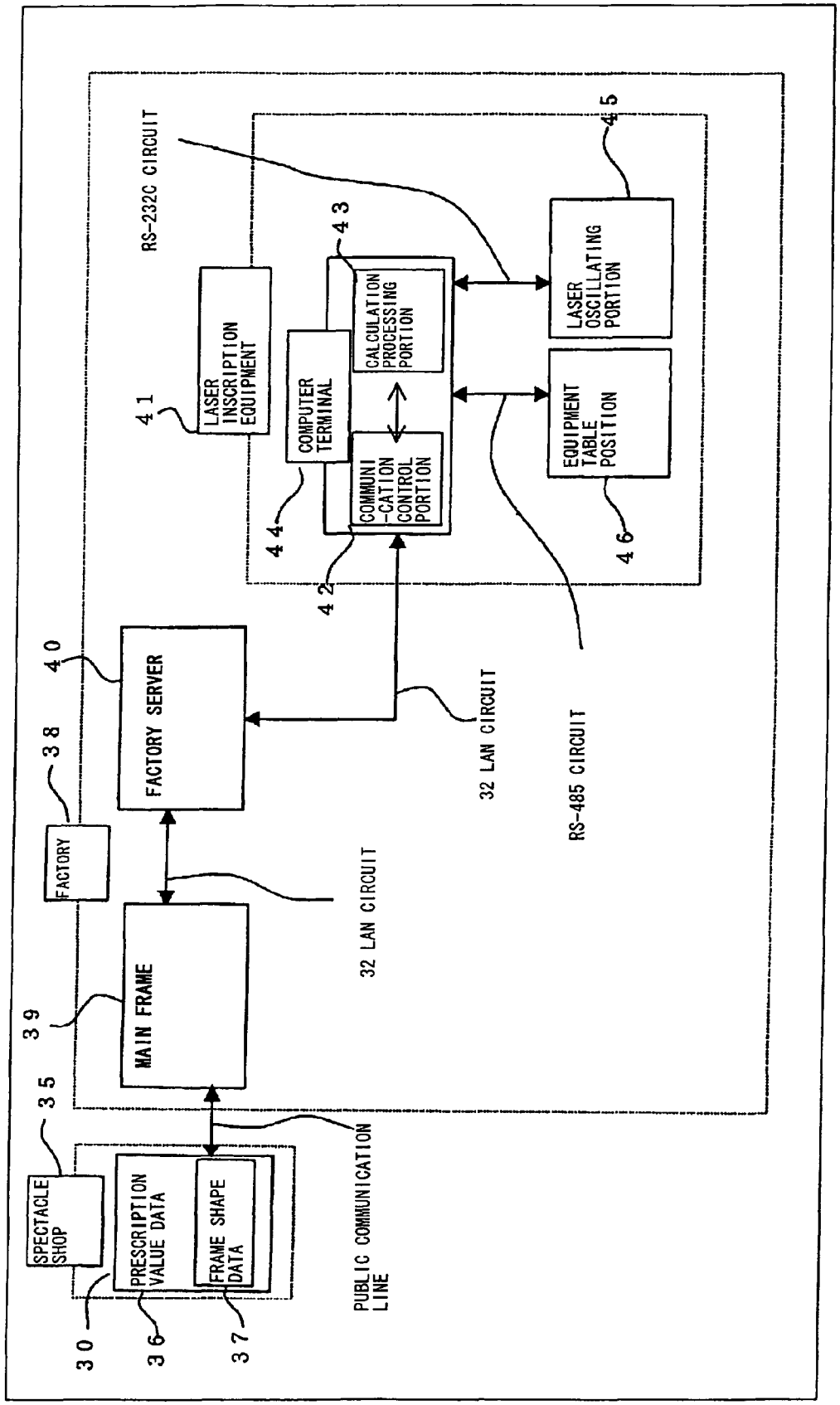
FIG. 2 is an overall view schematically showing a manufacturing system of the spectacle lens implementing an embodiment of a manufacturing method of the spectacle lens according to the present invention.
Figure 3:
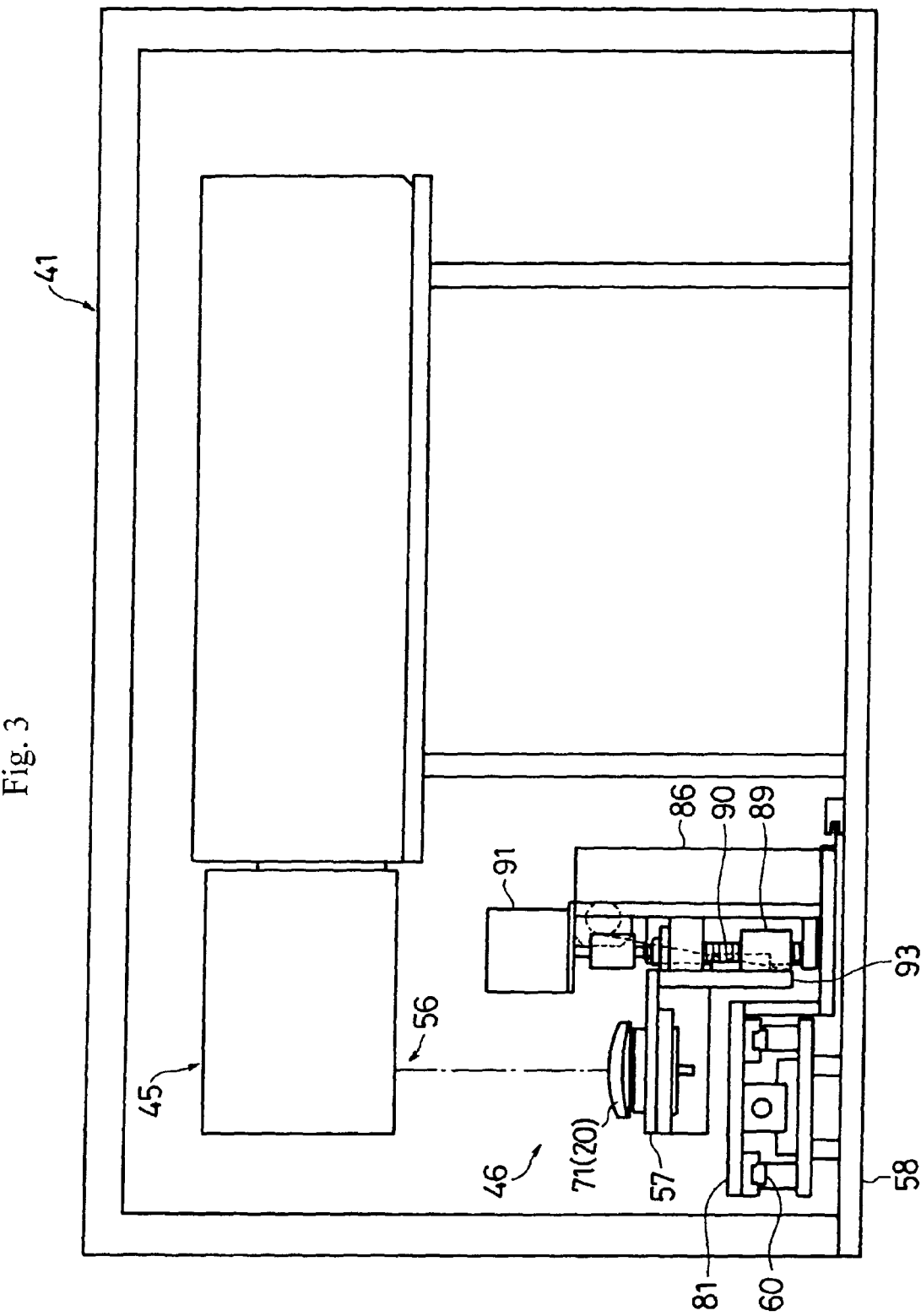
FIG. 3 is a side view showing a laser inscription equipment in FIG. 2.
Figure 4:
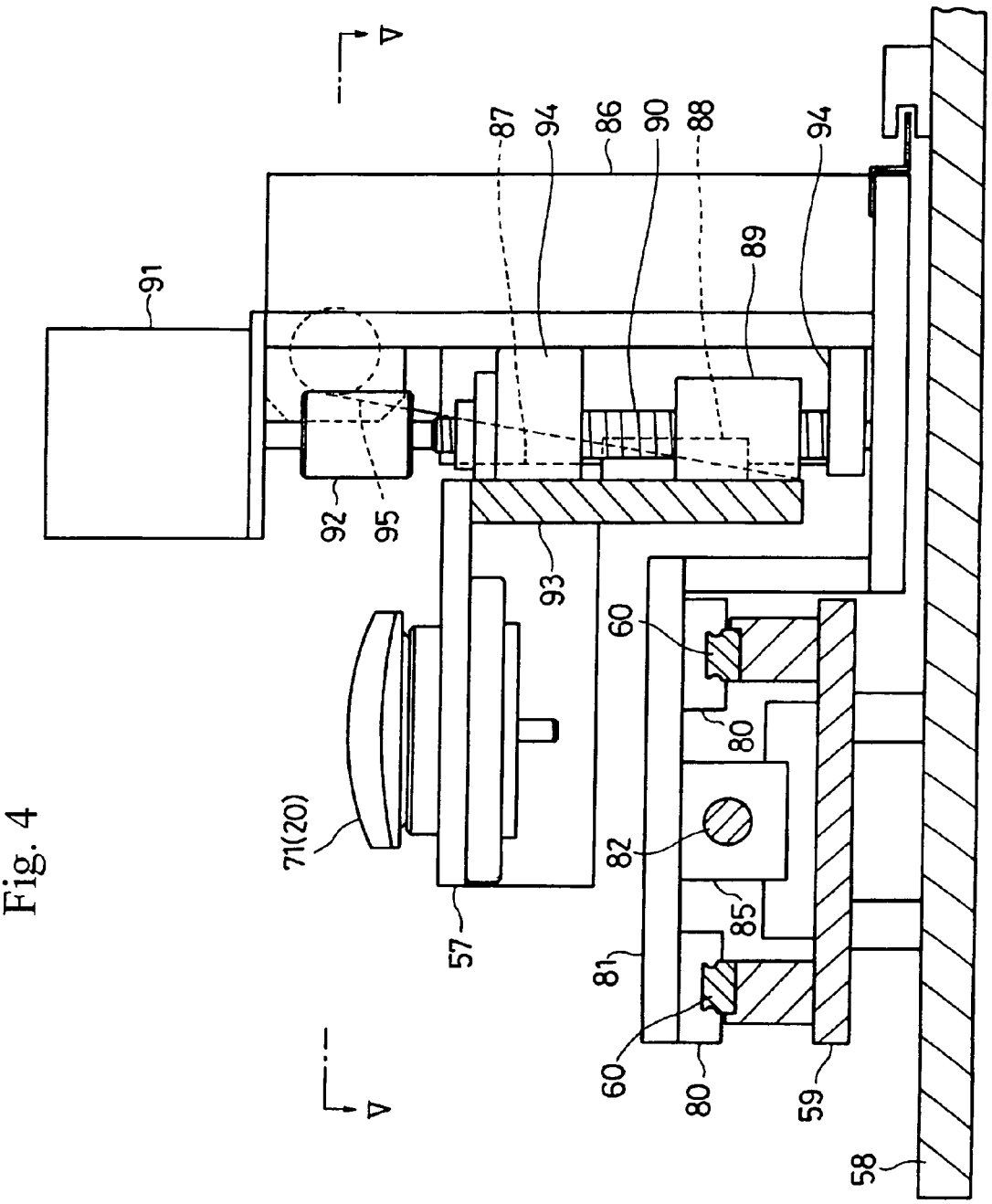
FIG. 4 is a side sectional view taken along the line IV-IV in FIG. 5 showing a mounting table position control portion in FIG. 3.
Figure 5:
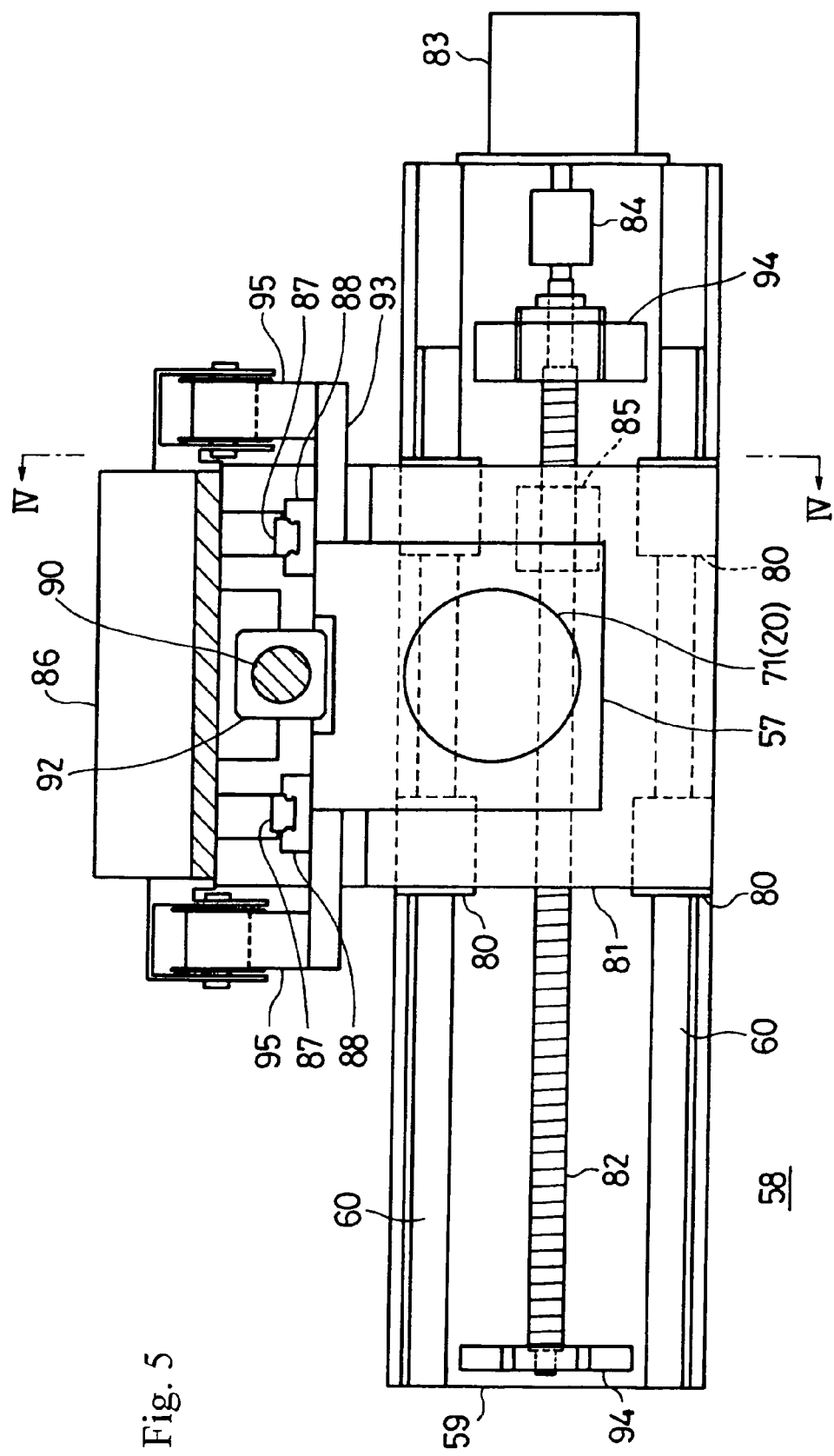
FIG. 5 is a sectional view taken along the line V-V in FIG. 4.
Figure 6:
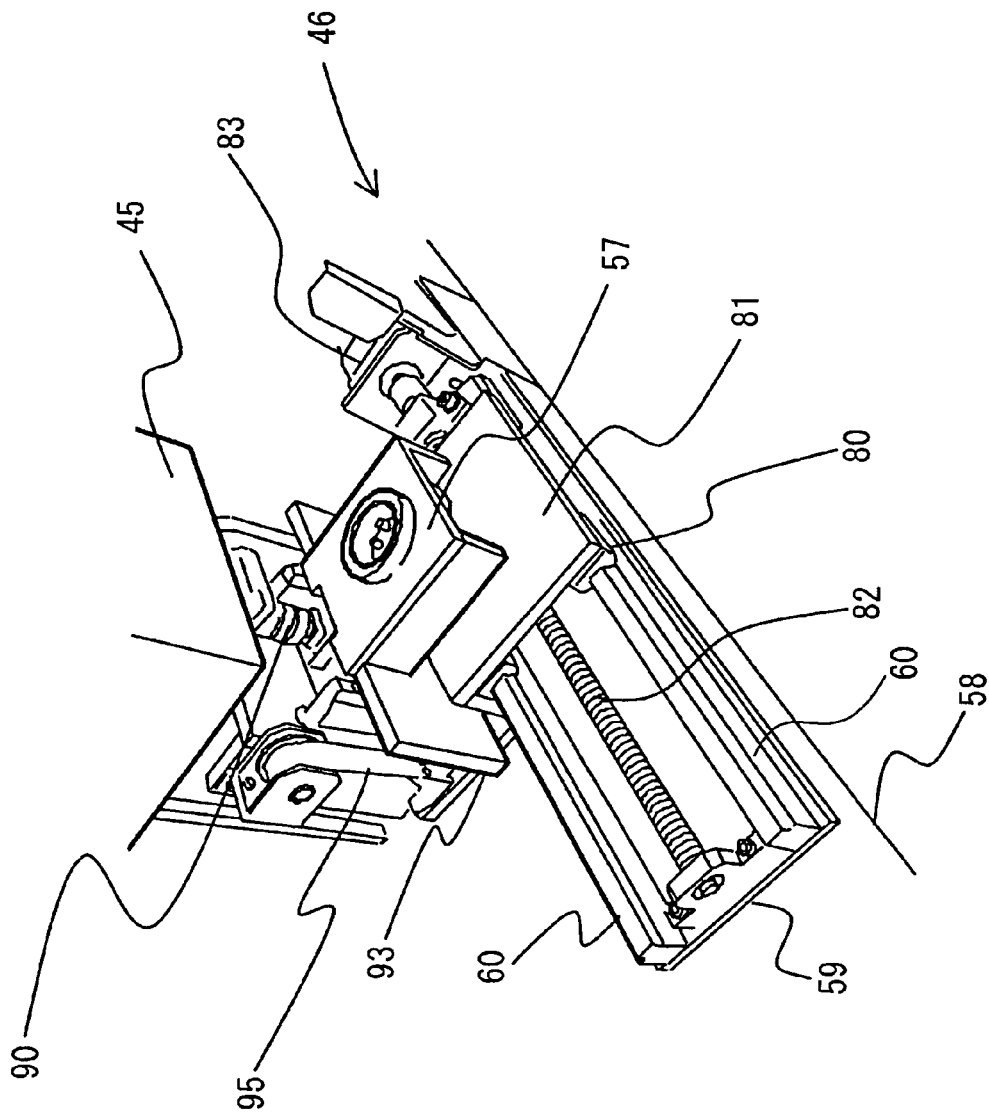
FIG. 6 is a perspective view showing a part of the laser inscription equipment in FIG. 3.
Figure 7:
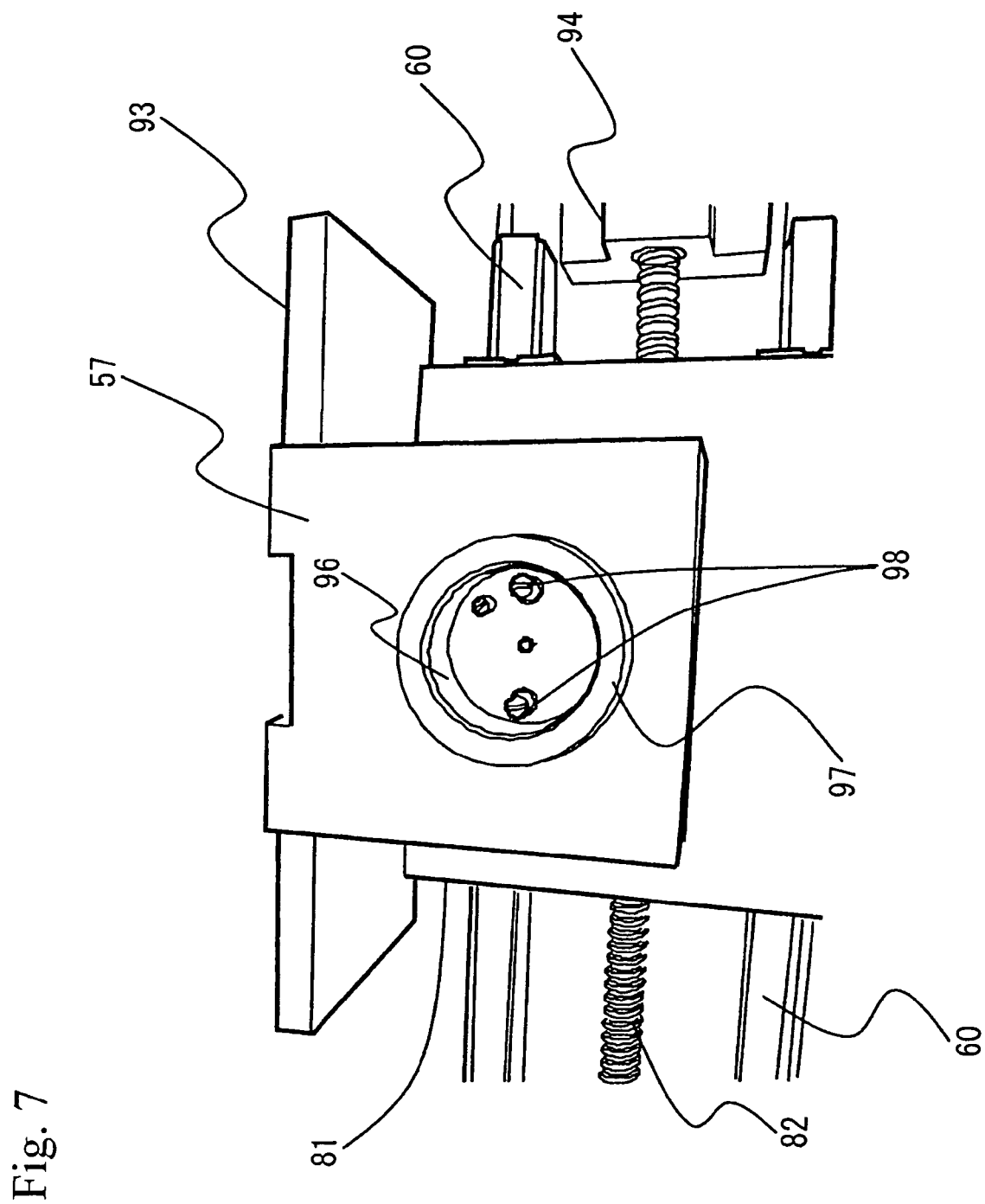
FIG. 7 is a plan view showing a mounting table in FIG. 6.
Figure 8:
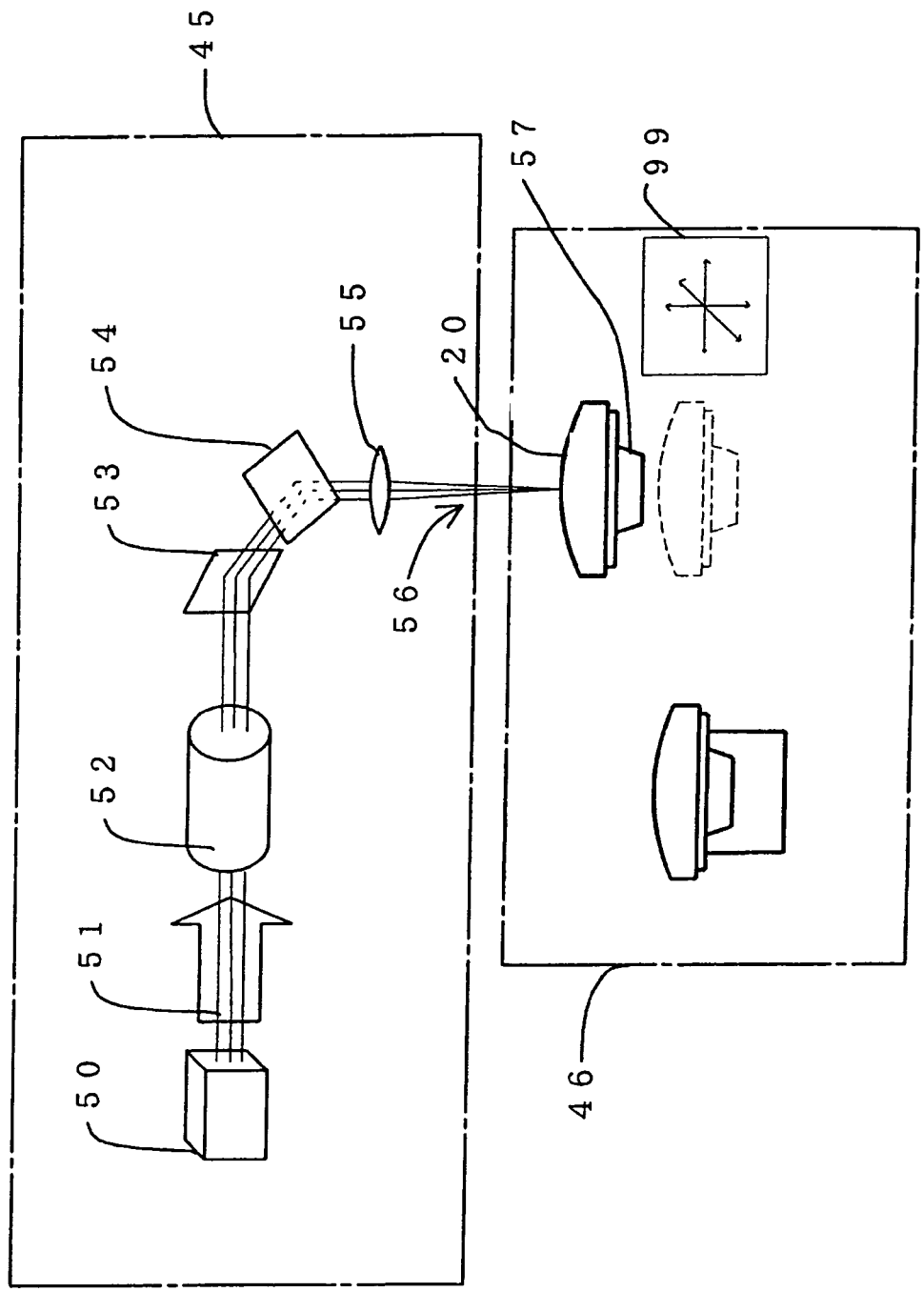
FIG. 8 is a configuration chart mainly showing a laser oscillation portion in FIG. 2.
Figure 9:
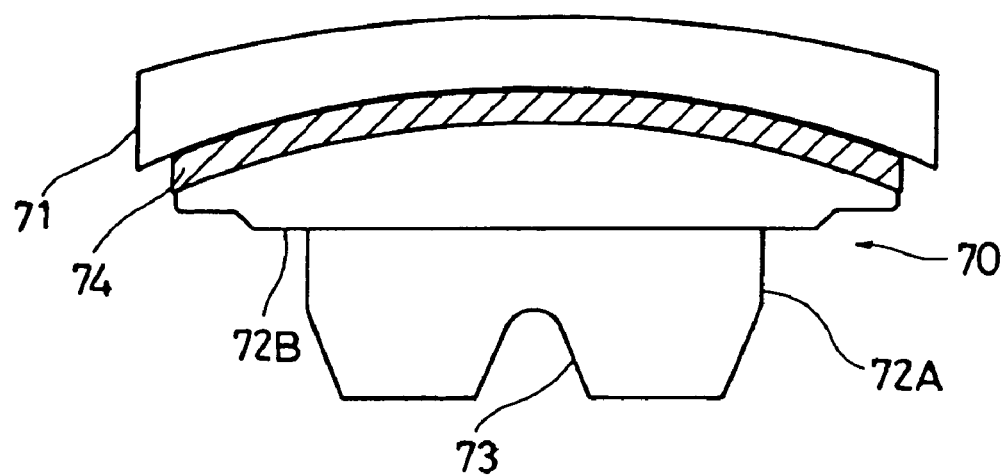
FIG. 9 is a side view showing a fixture to which a concave surface of the spectacle lens is blocked.
Figure 10:
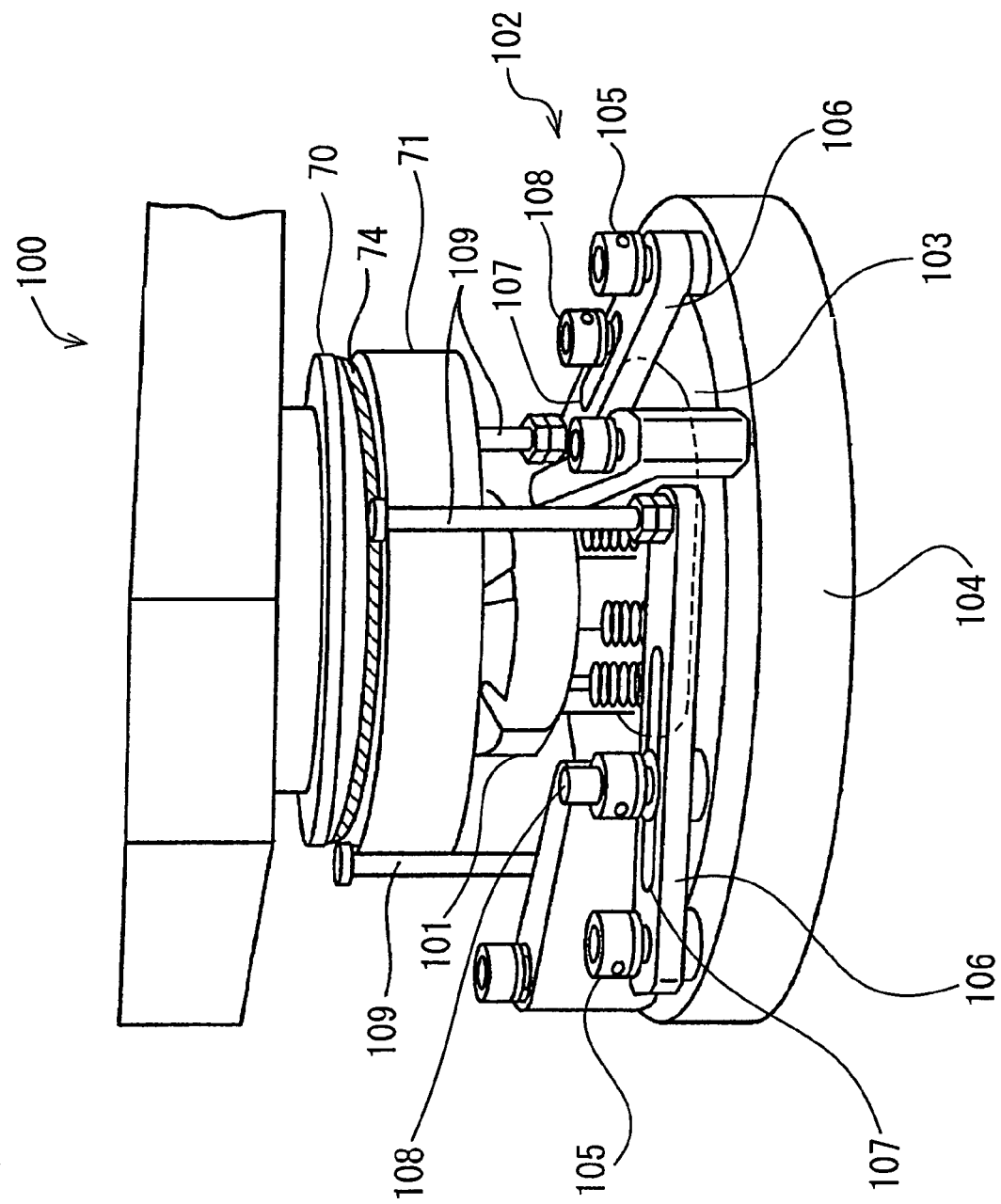
FIG. 10 is a perspective view showing a blocking equipment, the fixture, and so on, performing the blocking of the concave surface of the spectacle lens.
Figure 11:
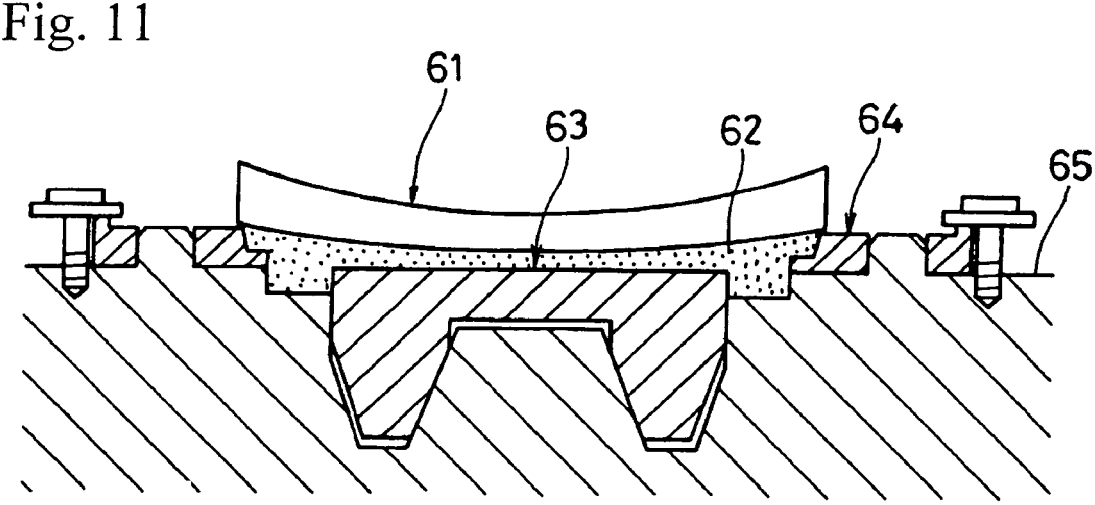
FIG. 11 is a side sectional view showing a part of a blocking equipment, a fixture, and so on, performing a blocking of a convex surface of the spectacle lens.
Figure 12:
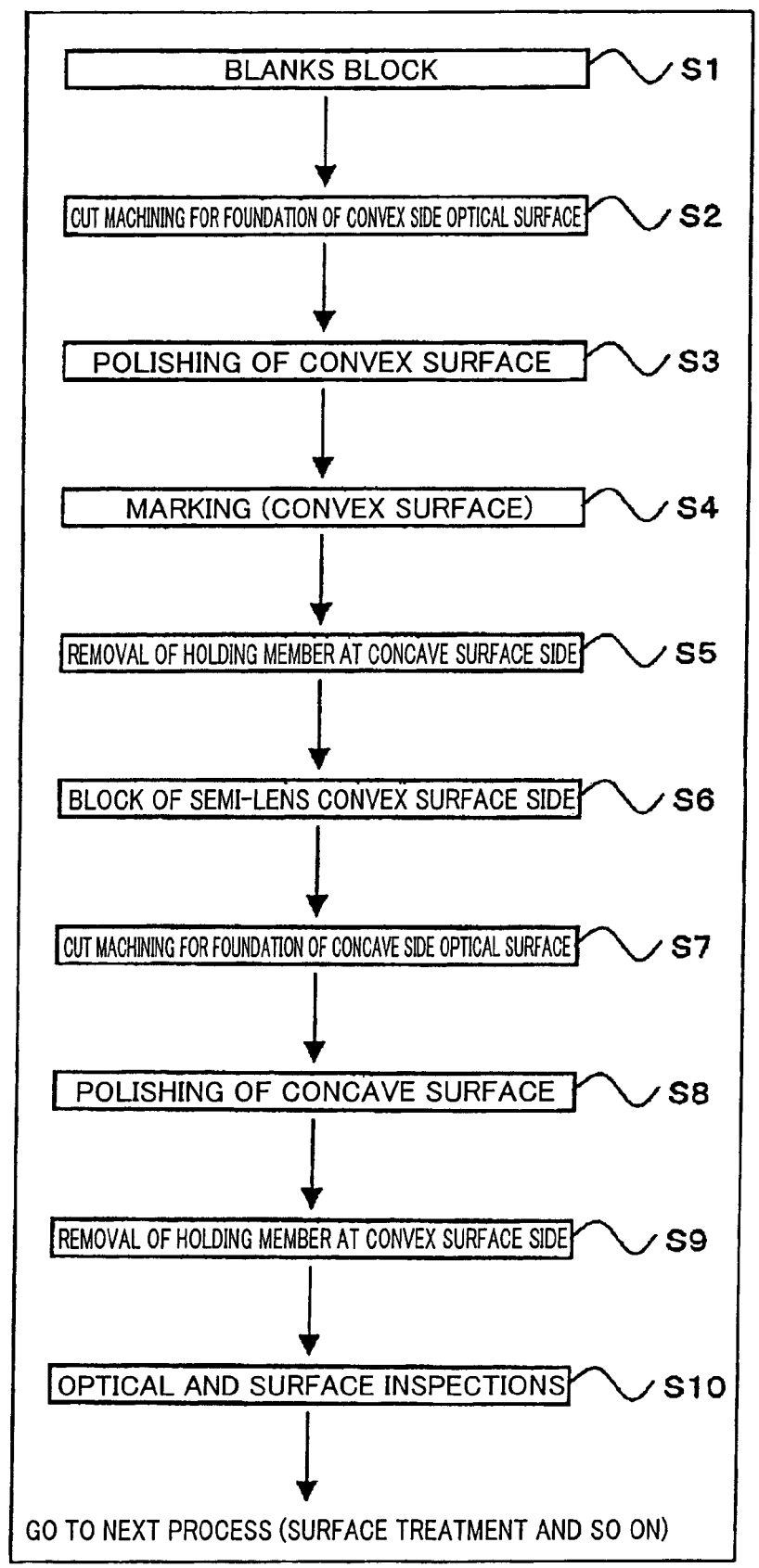
FIG. 12 is a flow chart showing an embodiment of a manufacturing method of the spectacle lens according to the present invention.
Figure 13:
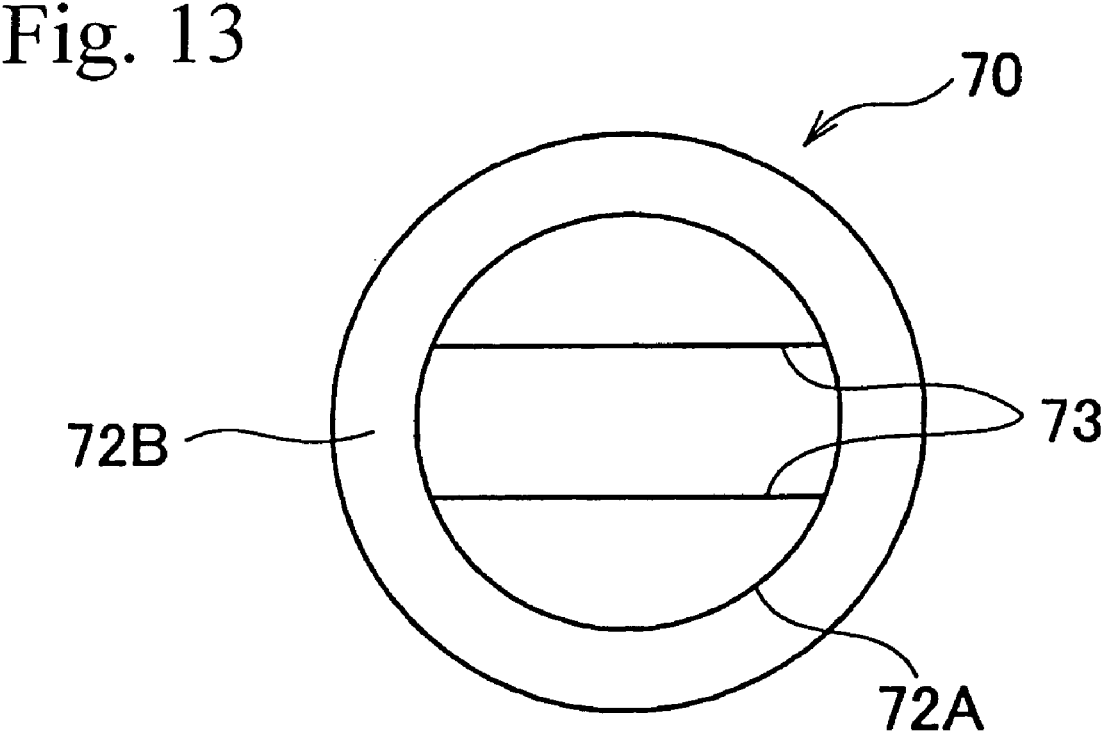
FIG. 13 is a view showing a bottom surface of the fixture shown in FIG. 9.
Figure 14:
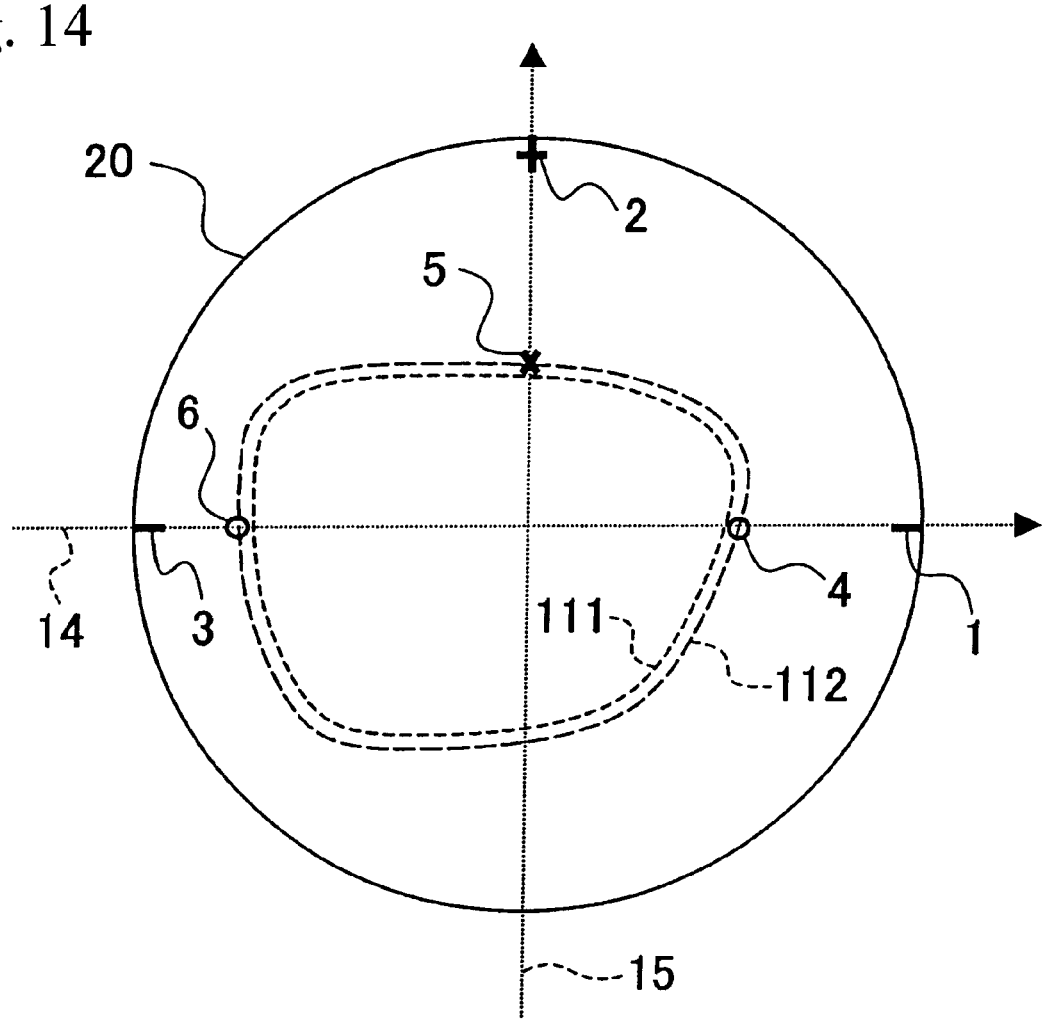
FIG. 14 is a view showing provisional reference position marks of the spectacle lens.
Figure 15:
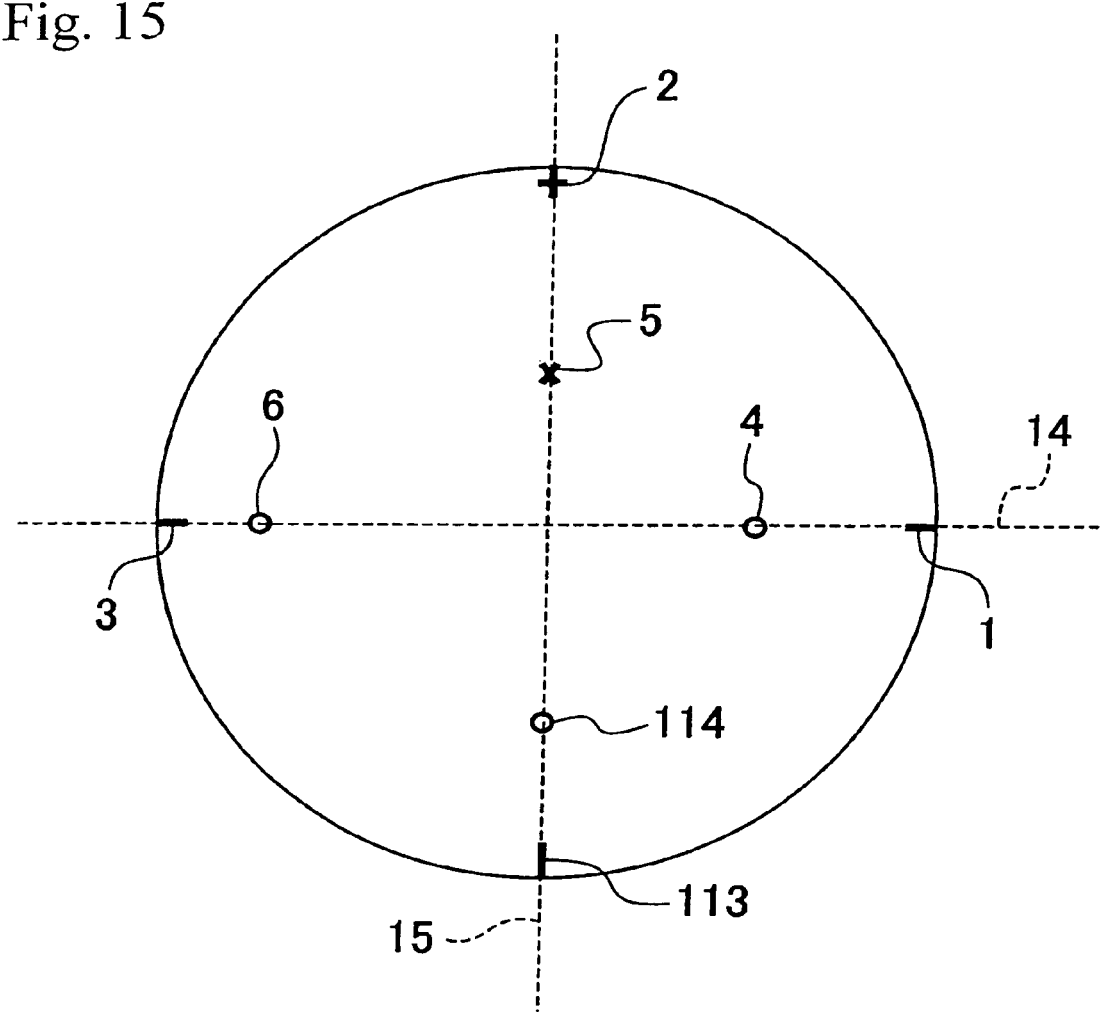
FIG. 15 is a view showing the provisional reference position marks of the spectacle lens.
Figure 16:
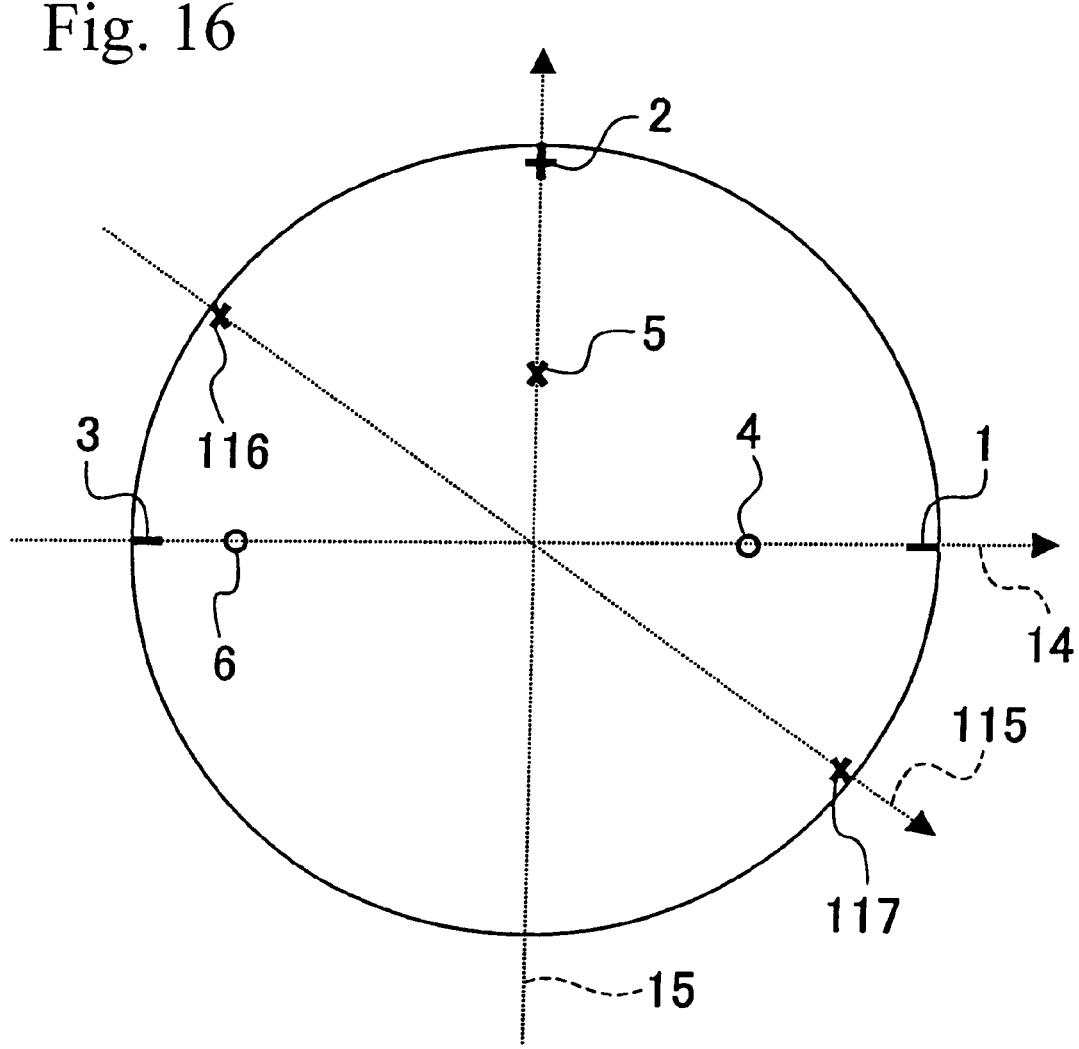
FIG. 16 is a view showing the provisional reference position marks of the spectacle lens.
Figure 17:
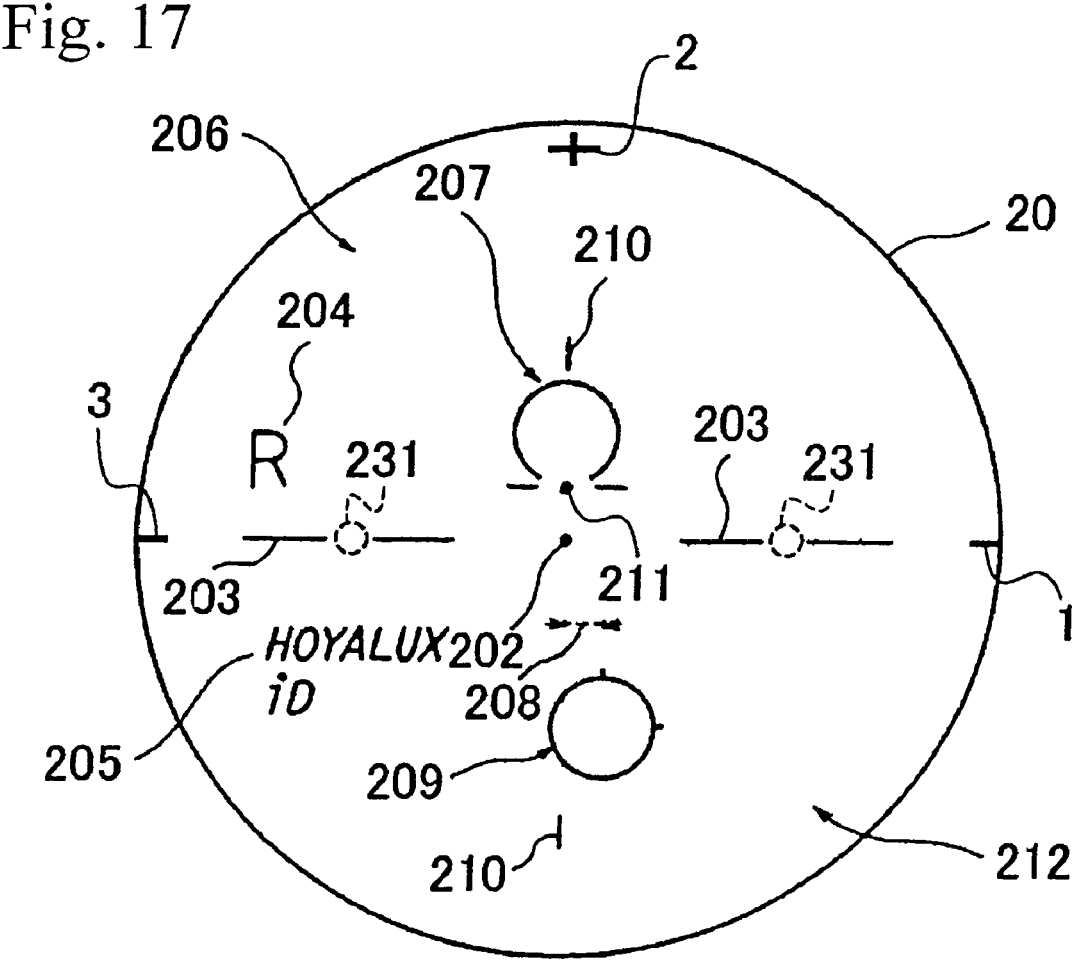
FIG. 17 is a view showing the spectacle lens on which layout marks are printed.
Figure 18:
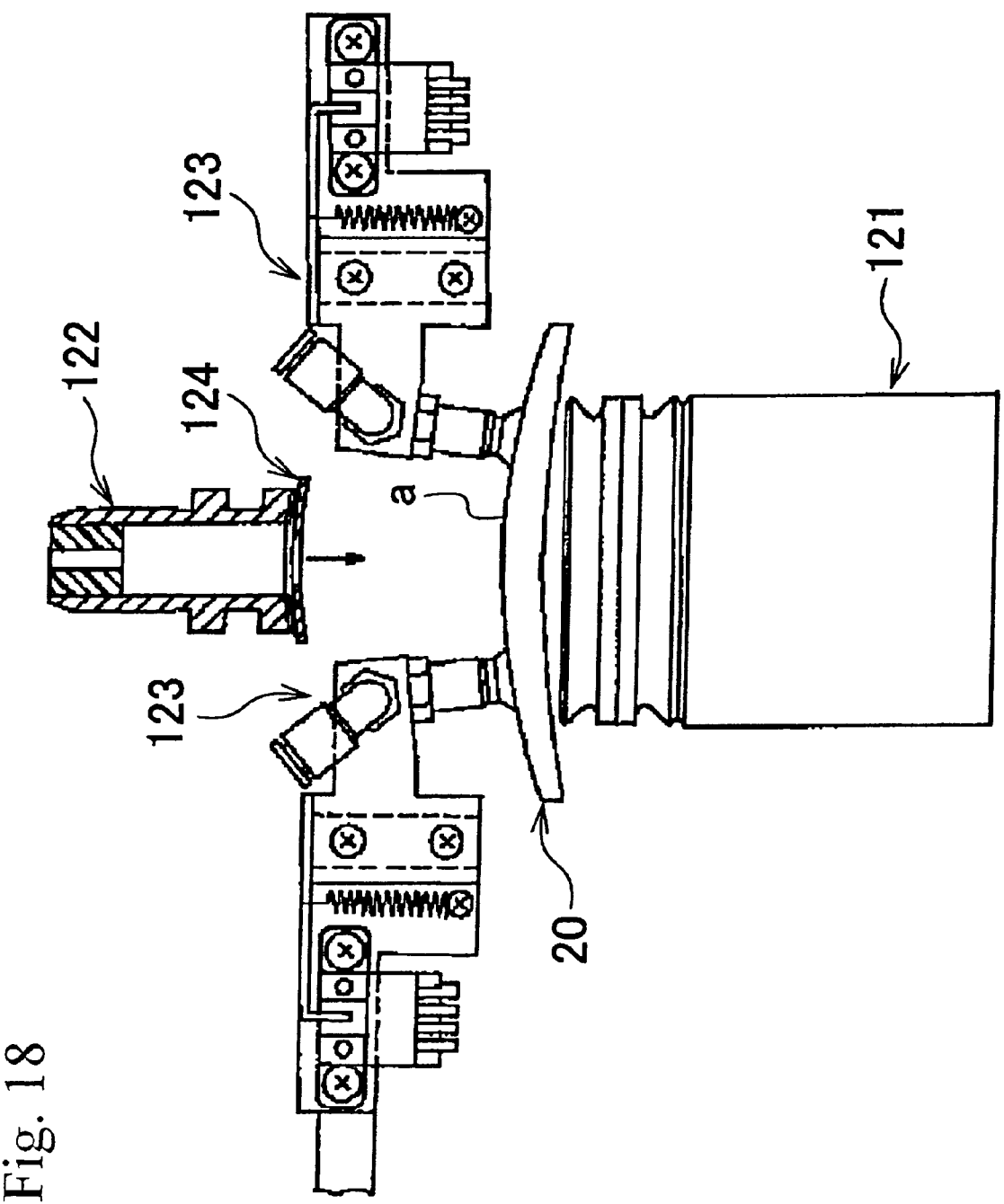
FIG. 18 is a side view showing an optical layout block equipment for an edge machining.

EXPLANATION OF CODES 1, 2, 3 first provisional reference position marks
4, 5, 6 second provisional reference position marks
8 boxing area mark
9, 10 alignment reference marks
11 product information
12 serial number information
13 individual manufacturing indicating information
20 progressive-power lens (spectacle lens)
30 ordering terminal
35 spectacle shop (ordering side)
38 factory (manufacturing side)
41 laser inscription equipment
44 computer terminal
45 laser oscillating portion
46 mounting tale position control portion
57 mounting table
70 fixture (lens holding member)
72A perpendicular reference surface
72B horizontal reference surface 73 rotational reference surface
111 edge rim shape
112 edge rim similar shape
231 hidden mark

The invention claimed is:

1. A method of manufacturing a spectacle lens from a spectacle lens blank, the method comprising:

providing the spectacle lens blank, the spectacle lens blank having a concave surface, a convex surface, and an edge shape;

blocking either the convex surface or the concave surface of the spectacle lens blank to a blocking member;

obtaining information including (1) a prescription of a finished spectacle lens, (2) a finished edge shape of the spectacle lens blank, and (3) an optical center position in the finished edge shape, the finished edge shape being an outer peripheral shape of the finished spectacle lens that corresponds to a frame rim shape;

grinding and polishing the unblocked surface of the spectacle lens blank based on the information obtained in the obtaining step, inscribing provisional reference marks at positions outside a region of the finished edge shape on the optical surface of the convex surface or the optical surface of the concave surface based on the information obtained in the obtaining step, the provisional reference marks defining a geometrical horizontal reference line and a geometrical perpendicular reference line which are orthogonal to each other and intersect at the optical center position which corresponds to a geometrical center of the spectacle lens blank;

blocking the convex surface or the concave surface that has not been grinded or polished in the grinding and polishing step to the blocking member and aligning the spectacle lens blank to the lens machining tool, with reference to the provisional reference marks inscribed in the inscribing step, before grinding and polishing the convex surface or the concave surface that has not been grinded or polished in the grinding and polishing step;

grinding and polishing the convex surface or the concave surface that has not been grinded or polished; and edging the spectacle lens blank to obtain a finished spectacle lens based on the information obtained in the obtaining step.

2. The manufacturing method of the spectacle lens according to claim 1, wherein the provisional reference marks are inscribed in a vicinity of outside of the region of the finished edge shape in the optical surface of the convex surface or the optical surface of the concave surface in the spectacle lens blank and in a vicinity of a circumferential edge of the spectacle lens blank.

3. The manufacturing method of the spectacle lens according to claim 1, wherein the blocking of the spectacle lens blank is sustained by the same blocking member during the grinding and polishing steps and the inscribing step.

4. The manufacturing method of the spectacle lens according to claim 1, wherein the inscribing step inscribes a provisional reference mark redundantly at least twice by a laser.

5. The manufacturing method of the spectacle lens according to claim 1, wherein an intermittent control is performed in which an oscillation of a laser is controlled intermittently and repeated with a time difference in the inscribing step.

6. The manufacturing method of the spectacle lens according to claim 1, wherein inscription positions to the spectacle lens blank are calculated by using at least a three-dimensional surface design data of the spectacle lens.

7. A method of manufacturing a spectacle lens from a spectacle lens blank, the method comprising:

providing the spectacle lens blank, the spectacle lens blank having a concave surface, a convex surface, and an edge shape;

blocking either the convex surface or the concave surface of the spectacle lens blank to a blocking member;

obtaining information including (1) a prescription of a finished spectacle lens, (2) a finished edge shape of the spectacle lens blank, and (3) an optical center position in the finished edge shape, the finished edge shape being an outer peripheral shape of the finished spectacle lens that corresponds to a frame rim shape;

grinding and polishing the unblocked surface of the spectacle lens blank based on the information obtained in the obtaining step;

inscribing hidden marks at positions inside a region of the finished edge shape on the optical surface of the convex surface or the optical surface of the concave surface based on the information obtained in the obtaining step, the hidden marks defining a geometrical horizontal reference line and a geometrical perpendicular reference line which are orthogonal to each other and intersect at the optical center position which corresponds to a geometrical center of the spectacle lens blank;

blocking the convex surface or the concave surface that has not been grinded or polished in the grinding and polishing step to the blocking member and aligning the spectacle lens blank to the lens machining tool, with reference to the hidden marks inscribed in the inscribing step, before grinding and polishing the convex surface or the concave surface that has not been grinded or polished in the grinding and polishing step;

grinding and polishing the convex surface or the concave surface that has not been grinded or polished; and edging the spectacle lens blank to obtain a finished spectacle lens based on the information obtained in the obtaining step.

* * * * *